(12) United States Patent
Iwai et al.

(10) Patent No.: US 10,688,875 B2
(45) Date of Patent: Jun. 23, 2020

(54) NON-CONTACT CHARGING SYSTEM AND PAIRING METHOD FOR NON-CONTACT CHARGING SYSTEM

(71) Applicant: TOYOTA JIDOSHA KABUSHIKI KAISHA, Toyota-shi, Aichi-ken (JP)

(72) Inventors: Atsushi Iwai, Tajimi (JP); Junji Inoue, Tokai (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 108 days.

(21) Appl. No.: 15/035,554

(22) PCT Filed: Sep. 3, 2014

(86) PCT No.: PCT/JP2014/073164
§ 371 (c)(1),
(2) Date: May 10, 2016

(87) PCT Pub. No.: WO2015/072212
PCT Pub. Date: May 21, 2015

(65) Prior Publication Data
US 2016/0297314 A1 Oct. 13, 2016

(30) Foreign Application Priority Data
Nov. 18, 2013 (JP) .................. 2013-238208

(51) Int. Cl.
*B60L 11/18* (2006.01)
*H02J 50/90* (2016.01)
(Continued)

(52) U.S. Cl.
CPC .......... *B60L 11/1846* (2013.01); *B60L 53/12* (2019.02); *B60L 53/36* (2019.02); *B60L 53/39* (2019.02);
(Continued)

(58) Field of Classification Search
CPC ............... B60L 11/182; B60L 11/1829; B60L 11/1831; B60L 53/12–126; H02J 50/10;
(Continued)

(56) References Cited

U.S. PATENT DOCUMENTS

2011/0193520 A1* 8/2011 Yamazaki ............... B60L 5/005
320/108
2011/0254503 A1* 10/2011 Widmer ................ B60L 11/182
320/108
(Continued)

FOREIGN PATENT DOCUMENTS

JP  H08-122568 A  5/1996
JP  2010-187495 A  8/2010
(Continued)

*Primary Examiner* — David V Henze-Gongola
(74) *Attorney, Agent, or Firm* — Finnegan, Henderson, Farabow, Garrett & Dunner, LLP

(57) ABSTRACT

In response to a detection of a presence of a device to be charged, a power supply control section sets, to a specific pattern, a pattern of electric power to be transmitted from a power transmission unit. The device to be charged acquires the specific pattern from the received electric power. The power supply control section identifies a combination between the power transmission unit and the device to be charged based on correspondence between information about the specific pattern that has been set, and the received information about the specific pattern.

16 Claims, 14 Drawing Sheets

(51) Int. Cl.
  *H02J 7/02*    (2016.01)
  *H02J 50/10*   (2016.01)
  *H02J 50/40*   (2016.01)
  *H02J 50/80*   (2016.01)
  *H02J 50/12*   (2016.01)
  *H02J 50/20*   (2016.01)
  *H02J 7/00*    (2006.01)
  *B60L 53/36*   (2019.01)
  *B60L 53/68*   (2019.01)
  *B60L 53/12*   (2019.01)
  *B60L 53/39*   (2019.01)
  *B60L 53/65*   (2019.01)

(52) U.S. Cl.
  CPC ............... *B60L 53/65* (2019.02); *B60L 53/68* (2019.02); *H02J 7/0027* (2013.01); *H02J 50/10* (2016.02); *H02J 50/12* (2016.02); *H02J 50/20* (2016.02); *H02J 50/40* (2016.02); *H02J 50/80* (2016.02); *H02J 50/90* (2016.02); *Y02T 10/7005* (2013.01); *Y02T 10/7055* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
  CPC .. H02J 50/12; H02J 17/00; H02J 7/025; H02J 5/005
  USPC ........................................................ 320/108
  See application file for complete search history.

(56) References Cited

U.S. PATENT DOCUMENTS

| | | | | |
|---|---|---|---|---|
| 2013/0038272 | A1* | 2/2013 | Sagata | B60L 3/12 320/106 |
| 2013/0147279 | A1* | 6/2013 | Muratov | H02J 5/005 307/104 |
| 2014/0035364 | A1* | 2/2014 | Uramoto | H01F 38/14 307/17 |
| 2014/0035522 | A1* | 2/2014 | Oishi | B60L 11/182 320/108 |
| 2014/0333128 | A1 | 11/2014 | Ichikawa | |
| 2014/0368166 | A1 | 12/2014 | Oishi | |
| 2014/0375266 | A1 | 12/2014 | Oishi | |
| 2014/0375267 | A1 | 12/2014 | Oishi | |
| 2015/0105955 | A1* | 4/2015 | Wu | B60L 11/1875 701/22 |
| 2015/0343917 | A1 | 12/2015 | Oishi | |
| 2018/0029482 | A1 | 2/2018 | Ichikawa | |

FOREIGN PATENT DOCUMENTS

| | | | | |
|---|---|---|---|---|
| JP | WO 2012086048 A1 * | 6/2012 | ............ | B60L 11/182 |
| WO | WO 2012/086048 A1 | 6/2012 | | |
| WO | WO-2012086048 A1 * | 6/2012 | ............... | H02J 7/025 |
| WO | WO 2012/111127 A1 | 8/2012 | | |
| WO | WO 2012/111155 A1 | 8/2012 | | |
| WO | WO2013/076834 A1 | 5/2013 | | |

* cited by examiner

|  | Pattern Assignment | | |
|---|---|---|---|
|  | Pattern 1 | Pattern 2 | Pattern 3 |
| First Charging Area BS1 | 1 sec | Occupied | Occupied |
| Second Charging Area BS2 | 2 sec | 1 sec | Occupied |
| Third Charging Area BS3 | 3 sec | Occupied | Occupied |
| Fourth Charging Area BS4 | 4 sec | 2 sec | 1 sec |
| Fifth Charging Area BS5 | 5 sec | 3 sec | 2 sec |

Fig.16

|  | Descending Order of Usage Rate | Pattern Assignment | |
| --- | --- | --- | --- |
|  |  | Pattern 11 | Pattern 12 |
| First Charging Area BS1 (BS) | 1 | 1 sec | Occupied |
| Second Charging Area BS2 (BS) | 3 | 3 sec | 2 sec |
| Third Charging Area BS3 (BS) | 5 | 5 sec | 3 sec |
| Fourth Charging Area BS4 (BS) | 4 | 4 sec | Occupied |
| Fifth Charging Area BS5 (BS) | 2 | 2 sec | 1 sec |

NON-CONTACT CHARGING SYSTEM AND PAIRING METHOD FOR NON-CONTACT CHARGING SYSTEM

CROSS-REFERENCE TO RELATED APPLICATIONS

This application is a national phase application of International Application No. PCT/JP2014/073164, filed Sep. 3, 2014, and claims the priority of Japanese Application No. 2013-238208, filed Nov. 18, 2013, the content of both of which is incorporated herein by reference.

TECHNICAL FIELD

The present disclosure relates to a non-contact charging system that charges a rechargeable battery installed in, for example, a vehicle in a noncontact manner. Furthermore, the present disclosure relates to a pairing method used in the non-contact charging system.

BACKGROUND ART

As is known in the art, electric cars and hybrid cars are equipped with an electric power source for an electric motor, which serves as a drive source. The electric power source is a storage battery (a rechargeable battery). One of systems for charging such a storage battery includes a non-contact charging system that supplies electric power from a power supplying apparatus to the storage battery in a noncontact manner without using a power supply cable. For example, the non-contact charging system includes a power transmitter coil included in the power supplying apparatus previously embedded in the ground surface and a power receiver coil mounted on the lower section of the body of a car to be charged. When the power receiver coil is located to face the power transmitter coil, electric power is transmitted by mutual induction or resonance through electromagnetic connection from the power transmitter coil to the power receiver coil.

A charging system may charge multiple cars at the same time by providing multiple power transmitter coils. In this case, when multiple cars are located with respect to the multiple power transmitter coils at the same time, the power supplying apparatus may possibly fail to determine which of the cars corresponds to each power transmitter coil, that is, the power supplying apparatus may possibly fail to perform the pair process. Patent Document 1, or International Publication WO2012/111127, discloses an example of techniques for pairing the power transmitter coils with cars even if multiple cars are located with respect to the multiple power transmitter coils at the same time.

Patent Document 1, or International. Publication WO2012/111127, discloses multiple charging devices, each of which includes a power transmitter coil for transmitting electric power to a car, and a charge control device, which transmits a first signal to the charging devices. One of the charging devices outputs, from the power transmitter coil, a second signal designated by the first signal. The car transmits a third signal corresponding to the second signal through wireless communication. The charge control device includes output means for transmitting the first signal, detecting means for detecting the third signal, and recognition means. The recognition means associates, or pairs, one of the charging devices with one of the cars based on the transmitted first signal and the detected third signal.

PRIOR ART DOCUMENTS

Patent Documents

Patent Document 1: International Publication No. WO2012/111127

SUMMARY OF THE INVENTION

Problems that the Invention is to Solve

According to the technique disclosed in Patent Document 1, or International Publication WO2012/111127, one of the power transmitter coils is paired with the car corresponding to the power transmitter coil. Thus, the charge control device obtains information about the storage battery of the car through wireless communication with the car and performs charging control suitable for the storage battery. However, if the power transmitter coil that is not originally designed for communication and the power receiver coil of the car are used to transmit and receive signals tor pairing, restrictions caused by the electric properties of the coils cannot be ignored.

Such a circumstance of pairing is not limited to pairing of the car and the power supplying apparatus, and there is a concern that the same restriction can occur in a system that charges multiple devices to be charged in a noncontact manner.

Accordingly, it is an objective of the present disclosure to favorably pair a power supplying apparatus with a device to be charged in non-contact charging.

Means for Solving the Problems

In accordance with one aspect of the present disclosure, a non-contact charging system is provided that includes a plurality of power transmitters, a communication section, and a power supply control section. The power transmitters are configured to supply electric power to a device to be charged in a noncontact manner. The communication section is configured to be capable of obtaining information transmitted from the device to be charged. The power supply control section is configured to control electric power transmitted by the power transmitters for each power transmitter. The existence of the device to be charged is detected. The power supply control section is configured to set a specific pattern as a pattern of electric power transmitted from each power transmitter in response to detection of the existence of the device to be charged, and the specific pattern varies from one power transmitter to another. The communication section is configured to receive information about the specific pattern transmitted from the device to be charged, and the device to be charged is configured to obtain the specific pattern from the received electric power. Each power transmitter and the device to be charged corresponding to the power transmitter configure a combination. The power supply control section is configured to identify the combination of each power transmitter and the device to be charged corresponding to the power transmitter based on correspondence between the information about the specific pattern that has been set and the information about the specific pattern that has been received.

In accordance with another aspect of the present disclosure, a non-contact charging system is provided that includes a device to be charged, a power supply control section, and a plurality of power transmitters. The device to be charged includes a power receiver configured to receive electric power for charging a storage battery and a communication section configured to be capable of communicating with an external device. The power supply control section includes a communication section configured to be capable of intercommunicating with the device to be charged. Each power transmitter is configured to transmit electric power to the device to be charged in a noncontact manner. Each power transmitter is configured such that the power supply control section controls electric power transmitted from the power transmitter. The existence of the device to be charged is detected. The power supply control section is configured to transmit electric power having a specific pattern from each power transmitter in response to detection of the existence of the device to be charged, and the specific pattern differs from one power transmitter to another. The device to be charged is configured to receive electric power from the associated power transmitter via the power receiver. The device to be charged is configured to transmit information about the specific pattern of the obtained electric power to the power supply control section via the communication section. The power supply control section is configured to identify a combination of each power transmitter and the device to be charged. The power supply control section is configured to identify the combination of each power transmitter and the device to be charged based on correspondence between the information about the specific pattern that has been set and the information about the specific pattern that has been transmitted.

In accordance with another aspect of the present disclosure, a pairing method used in a non-contact charging system is provided. The non-contact charging system includes a plurality of power transmitters configured to supply electric power to a device to be charged in a noncontact manner, a communication section configured to be capable of obtaining information transmitted from the device to be charged, and a power supply control section configured to control electric power transmitted from the power transmitters for each power transmitter. The existence of the device to be charged is detected. The pairing method includes: setting a pattern of electric power to be transmitted from each power transmitter to a specific pattern by the power supply control section in response to detection of the existence of the device to be charged, wherein the specific pattern differs from one power transmitter to another; receiving information about the specific pattern transmitted from the device to be charged by the communication section, wherein the device to be charged obtains the information about the specific pattern from the reserved electric power; and determining a combination of each power transmitter and the device to be charged corresponding to the power transmitter by the power supply control section, wherein the power supply control section identifies the combination of each power transmitter and the device to be charged based on correspondence between the information about the specific pattern that has been set and the information about the specific pattern that has been received.

With these configurations and method, based on the specific pattern that varies from power transmitter to another, each power transmitter and the device to be charged corresponding to the power transmitter are identified, or paired. Thus, each power transmitter is favorably paired with the device to be charged.

Communication equipment for pairing does not need to be provided separately. This system prevents reduction in the space for the power supply control section and the device to be charged.

With such pairing, the power supply control section charges the storage battery in a suitable manner in accordance with the state of the storage battery obtained through communication.

The device to be charged is preferably provided on a vehicle, and the vehicle includes a power receiver, and the power supply control section preferably includes a first section, which sets, to the specific pattern, the pattern of electric power to be transmitted from each power transmitter. The specific pattern varies from one power transmitter to another. The power supply control section is preferably configured to include, in addition to the first section, which sets the specific pattern, a second section, which sets, to an alignment pattern, the pattern of the electric power to be transmitted from each power transmitter, and the alignment pattern is preferably used to align the power receiver of the vehicle with respect to each power transmitter.

With this configuration, the vehicle equipped with the storage battery is aligned in accordance with the electric power having the alignment pattern to be parked at a position where it is possible to favorably transfer electric power. Since the vehicle is aligned as described above, any electric power including the electric power having a specific pattern used for pairing can be favorably transmitted and received.

The alignment pattern is preferably a pattern different from the specific pattern.

With this configuration, besides the specific pattern for pairing, a pattern of the electric power suitable for alignment is set in a suitable manner. Thus, the alignment is also performed in a suitable manner. As the pattern of electric power suitable for alignment, electric power having a constant electric power strength is preferable so that the vehicle receives electric power in a stable manner.

The power supply control section is preferably configured to identify the combination of each power transmitter and the device to be charged when alignment of the power receiver of the vehicle with respect to the power transmitter ends.

With this configuration, paring is performed in a state in which each power transmitter and the device to be charged are in a positional relationship that allows the power transmitter and the vehicle to favorably transmit and receive electric power. Thus, electric power having the specific pattern for pairing is also favorably transmitted and received between each power transmitter and the device to be charged and paring is reliably performed.

An electrical change preferably occurs in each power transmitter, and the power supply control section is preferably configured to detect an end of the alignment based on the electrical change that occurs in each power transmitter.

With this configuration, the end of the alignment is detected by the power supply control section based on the electrical change in the impedance, the current, the voltage, the phase, and the cycle of the power transmitter. Since the end of the alignment is detected with a small number of components, it is expected that the structure will be simplified and the costs will be reduced. The power supply control section is shifted to a subsequently performed process, for example, a paring process in a short time.

Each power transmitter is preferably configured to transmit electric power having the set specific pattern during an output period, and the power supply control section is preferably configured to transmit electric power having the set specific pattern from each of the power transmitters such that there is a timing at which the output periods from the power transmitters at least partially overlap one another.

With this configuration, even if electric powers having different specific patterns from each other are output from the power transmitters at a timing at which output periods of the electric powers having the specific patterns at least partially overlap, pairing of the device to be charged and each power transmitter is possible. That is, since pairing is performed in a suitable manner even if electric powers having the specific patterns are output from the power transmitters at substantially the same time, the time required for pairing is reduced.

The specific pattern is preferably expressed by a pulse generated by a pulse change of electric power, and the information about the specific pattern preferably includes information about a property of the pulse detected from the specific pattern.

With this configuration, since it is relatively easy to output a pulse of the electric power from the power transmitter by outputting and stopping electric power, pairing is easily performed by using the electric power with changes in pulse.

The information about the property of the pulse of the electric power is preferably expressed by a pulse width of the pulse.

With this configuration, if the information about the specific pattern is the pulse width, the specific pattern can be generated simply by changing the timing to output and stop the electric power. Thus, electric powers having different specific patterns are easily produced.

The specific pattern is preferably a pattern configured by only one pulse.

With this configuration, if the specific pattern is made of one pulse, the time required for detecting the specific pattern is reduced. Thus, the time required for pairing is also reduced. One pulse is easily output from the power transmitter.

In accordance with one aspect of the present disclosure, a non-contact charging system including a power receiver is provided. The power receiver is configured to receive electric power transmitted from a power transmitter in a non-contact manner. The power receiver is further configured to supply the received electric power to a device to be charged. The power transmitter is configured to transmit electric power in accordance with a specific pattern set by a power supply control section. The device to be charged is configured to receive electric power from the power receiver. The device to be charged includes a pattern information obtaining section configured to obtain information about the specific pattern from electric power received from the power receiver and a communication section configured to transmit the obtained information about the specific pattern to the power supply control section.

In accordance with another aspect of the present disclosure, a pairing method used in a non-contact charging system is provided. The non-contact charging system includes a power receiver configured to receive electric power transmitted from a power transmitter in a noncontact manner, and the power transmitter is configured to transmit electric power in accordance with a specific pattern set by a power supply control section. The power receiver is configured to supply the received electric power to a device to be charged. The pairing method includes obtaining, by the device to be charged, information about the specific pattern from electric power received from the power receiver, and transmitting the obtained information about the specific pattern to the power supply control section.

With this configuration or method, by obtaining the information about the specific pattern from the received electric power and transmitting the information to the power supply control section, the device to be charged is associated or paired with the power transmitter that has output the specific pattern. Thus, the power supplying apparatus and the device to be charged are more favorably paired in the non-contact charging.

BRIEF DESCRIPTION OF THE DRAWINGS

FIG. 16 is a map showing an example of assignment of specific patterns for pairing vehicles and charging areas according to another modification.

MODES FOR CARRYING OUT THE INVENTION

First Embodiment

A non-contact charging system according to a first embodiment will now be described with reference to FIGS. 1 to 10.

An overview of the non-contact charging system will now be described.

Figure 1:
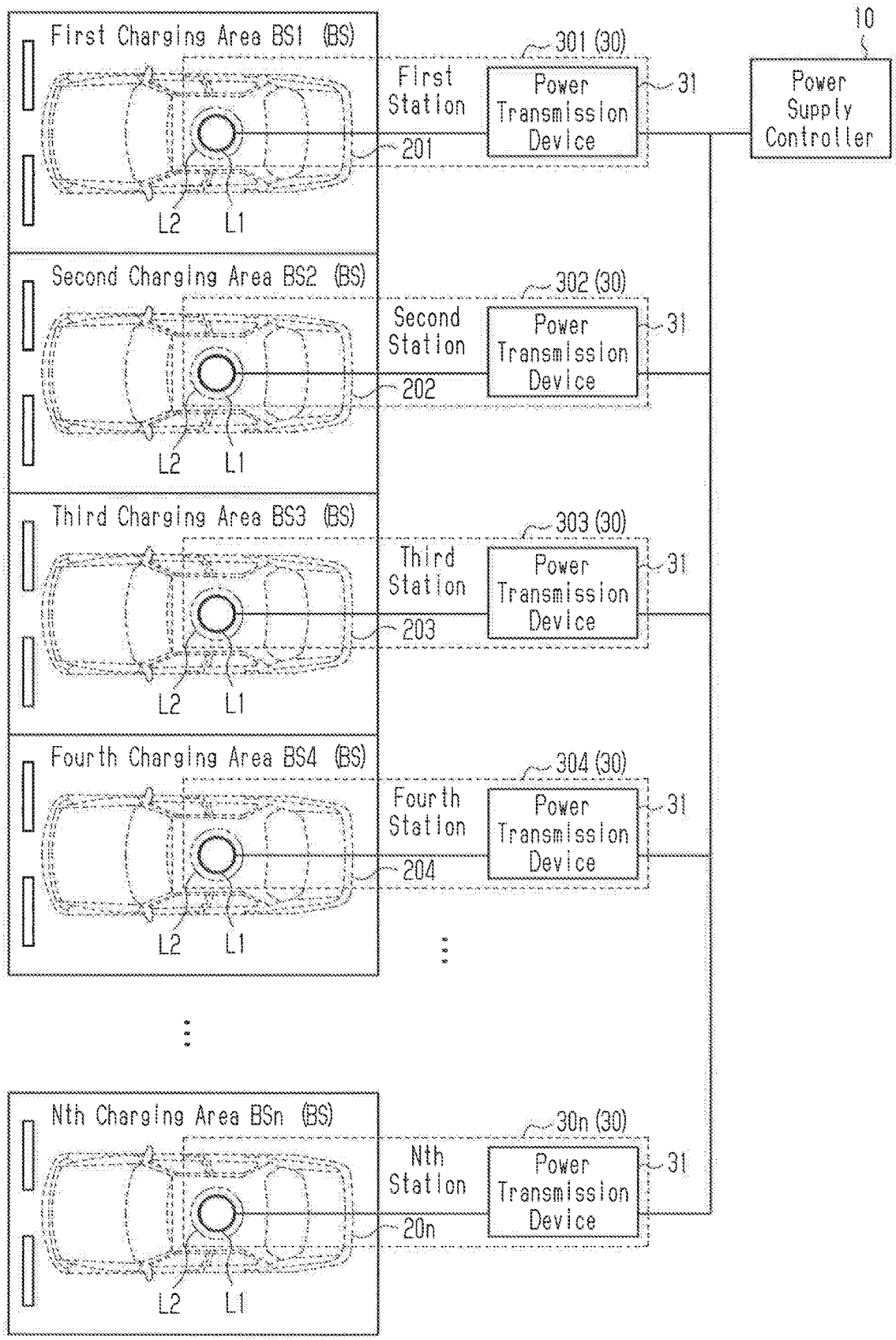
FIG. 1 is a schematic plan view of a non-contact charging system according to a first embodiment of the present disclosure.
Figure 2:
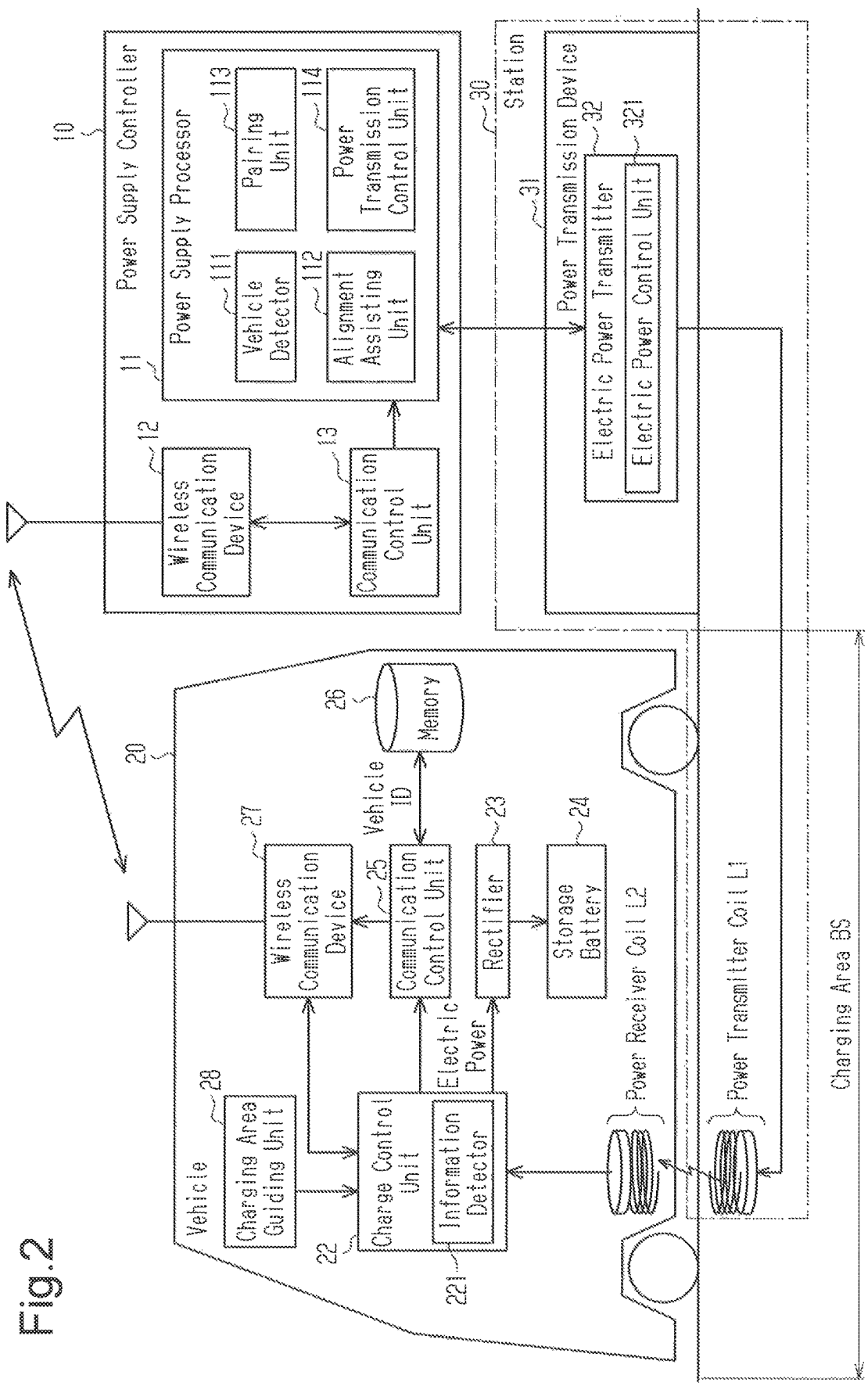
FIG. 2 is a block diagram showing a schematic configuration of the non-contact charging system, shown in FIG. 1.

As shown in FIG. 2, the non-contact charging system of the present embodiment is a system for supplying electric power to a device to be charged in a noncontact manner. In the present embodiment, the non-contact charging system includes a power supplying apparatus that supplies AC power for charging a storage battery 24 installed in a vehicle 20 from the outside of the vehicle 20. In the present embodiment, the device to be charged is the vehicle 20, and the vehicle 20 is an electric car or a hybrid car (in particular, a plug-in hybrid car) equipped with the storage battery 24 as the power source of the electric motor. Although multiple vehicles 201 to 20n are shown in FIG. 1, each vehicle is simply referred to as the vehicle 20 unless there is a need to specify the vehicle for description.

The non-contact charging system includes a power supply controller 10, which controls supply of electric power to the device to be charged, and multiple stations 30, which are connected to the power supply controller 10. The electric power to be supplied from the stations 30 is controlled by the power supply controller 10. For example, the non-contact charging system includes a first station 301, a second, station 302, a third station 303, a fourth station 304, . . . , and an nth station 30n. Hereinafter, each station is simply referred to as a station 30 unless it is necessary to specify the station for description.

The power supplying apparatus of the present embodiment is configured by the power supply controller 10 and the stations 301 to 30n.

The power supply controller 10 determines the presence/absence of a device to be charged in the station 30. If it is determined that there is a device to be charged, the power supply controller 10 controls electric power to be transmitted to the device to be charged by outputting, to a power transmission device 31, a signal regarding control of electric power to be transmitted. The signal regarding control of electric power to be transmitted generated by the power supply controller 10 includes control signals regarding starting/stopping of power transmission, the voltage, the current, the phase, and the cycle.

Each station 30 includes the power transmission device 31 and a power transmitter coil L1, which is connected to the power transmission device 31.

The power transmission device 31 is electrically connected to the power transmitter coil L1, which transmits electric power to the device to be charged in a noncontact manner. Each power transmission device 31 transmits, from the power transmitter coil L1, which is connected to the power transmission device 31, electric power that corresponds to the signal regarding the control of electric power to be transmitted that is input from the power supply controller 10. That is, the electric power transmitted from each power transmitter coil L1 is adjusted by the associated power transmission device 31 to which the power transmitter coil L1 is connected.

Each station 30 corresponds to one of charging areas BS. The charging areas BS are areas where the device to be charged, or the vehicle 20, is located. The electric power is transmitted to the vehicle 20 located in the area from the power transmission device 31 corresponding to the charging area BS. The present embodiment includes a first charging area BS1 corresponding to the first station 301, a second charging area BS2 corresponding to the second station 302, a third charging area BS3 corresponding to the third station 303, a fourth charging area BS4 corresponding to the fourth station 304, . . . , and an nth charging area BSn corresponding to the nth station 30n. Hereinafter, each charging area is simply referred to as the charging area BS unless it is necessary to specify the charging area for description.

Thus, when the vehicle 20 is located in the charging area BS, the power supply controller 10 outputs a signal regarding electric power to be transmitted to the power transmission device 31 of the station 30 corresponding to the charging area BS in which the vehicle 20 is located. Thus, the electric power is transmitted to the vehicle 20 from the power transmitter coil L1, which is connected to the power transmission device 31 of the station 30. The electric power transmitted in this manner is received by a power receiver coil L2 of the vehicle 20 to be supplied to the vehicle 20.

FIG. 2 illustrates the specifics of the non-contact charging system.

Since the stations 301 to 30n and the vehicles 201 to 20n have substantially the same configurations, in FIG. 2, the power supply controller 10, one of the stations 30, and one of the vehicles 20 will be described as an example for convenience of description.

As shown in FIG. 2, the vehicle 20 includes a non-illustrated electric motor, which serves as a drive source, and the storage battery 24, which serves as the electric power source of the electric motor. The vehicle 20 includes the power receiver coil L2, which receives, in a noncontact manner, electric power for charging the storage battery 24, a charge control unit 22, which controls charging of the storage battery 24 with the electric power received by the power receiver coil L2, and a rectifier 23, which rectifies received electric power and charges the storage battery 24 in accordance with the control of the charge control unit 22. In the present embodiment, the power receiver coil L2 and the charge control unit 22 configure a power receiver.

The storage battery 24 is a rechargeable battery suitable for the power source of the vehicle 20 and is a lithium ion battery or a nickel-metal-hydride battery. The storage battery 24 is connected to an electric device including the electric motor and the rectifier 23. Thus, the storage battery 24 can output DC power to be supplied to the electric device including the electric motor and instead receives DC power for charging from the rectifier 23.

The rectifier 23 is coupled to the charge control unit 22 to be capable of receiving AC power and to the storage battery 24 to be capable of outputting DC power. The rectifier 23 converts the AC power received from the charge control unit 22 to DC power suitable for charging the storage battery 24 and outputs the DC power to the storage battery 24. The AC/DC conversion of the rectifier 23 is controlled by the charge control unit 22, and the rectifier 23 converts AC power to DC power in accordance with the control. That is, the rectifier 23 outputs electric power for charging the storage battery 24 in accordance with the control of the charge control unit 22.

The charge control unit 22 is connected to the power receiver coil L2 to be capable of receiving electric power front the power receiver coil L2. The charge control unit 22 is connected to the rectifier 23 to be capable of outputting the received electric power and to be capable of controlling conversion of electric power to be charged to the storage battery 24. Thus, when electric power for charging the vehicle 20 is transmitted from the power transmission device 31, the charge control unit 22 transmits the electric power received by the power receiver coil L2 to the rectifier 23, which rectifies the electric power. The charge control unit 22 also controls conversion of the electric power by the rectifier 23.

The power receiver coil L2 is a coil that allows electric power to be induced by electromagnetic induction or electromagnetic coupling with the power transmitter coil L1 and receives the electric power transmitted from the power transmitter coil L1. The power receiver coil L2 receives electric power transmitted from the power transmitter coil L1 and outputs the received electric power to the charge control unit 22.

In this manner, the storage battery 24 is charged by the electric power that is supplied from the power transmission device 31 via the power receiver coil L2, the charge control unit 22, and the rectifier 23. Such a charging state of the storage battery 24 is monitored by the charge control unit 22.

The charge control unit 22 includes an information detector 221, which serves as a pattern information obtaining section for detecting information about the received electric power from the electric power that has been received by the power receiver coil L2. The information detector 221 detects information about electric power input from the power receiver coil L2 such as the voltage, the current, the cycle, and the phase. The information detector 221 obtains information about a specific pattern based on variation of the voltage from the received electric power (information obtaining process). For example, the information detector 221 detects, as the specific pattern, the length of time period during which the voltage, which is the information about the electric power, is detected, or the period during which the electric power is received, from the electric power input from the power receiver coil L2. The information about the specific pattern obtained from the electric power detected as described above is output from the charge control unit 22 to a communication control unit 25 and at charging area guiding unit 28. The information detector 221 outputs the information about the specific pattern to the communication control unit 25 so that the information about the specific pattern is transmitted to the power supply controller 10 via a wireless communication device 27 (transmitting process).

The vehicle 20 includes a communication section capable of communicating with a charging device. The communication section includes the wireless communication device 27, the communication control unit 25, which transmits information from the wireless communication device 27, and a memory 26, which stores, for example, information to be transmitted. The vehicle 20 includes the charging area guiding unit 28, which assists in aligning the vehicle 20 with respect to the power transmitter coil L1 of the station 30 in the charging area BS.

The charging area guiding unit 28 generates guide information for guiding a driver (user) of the vehicle 20 to move the vehicle 20 to a predetermined position in the charging area BS based on the strength of the received electric power detected by the information detector 221 of the charge control unit 22.

Figure 3:
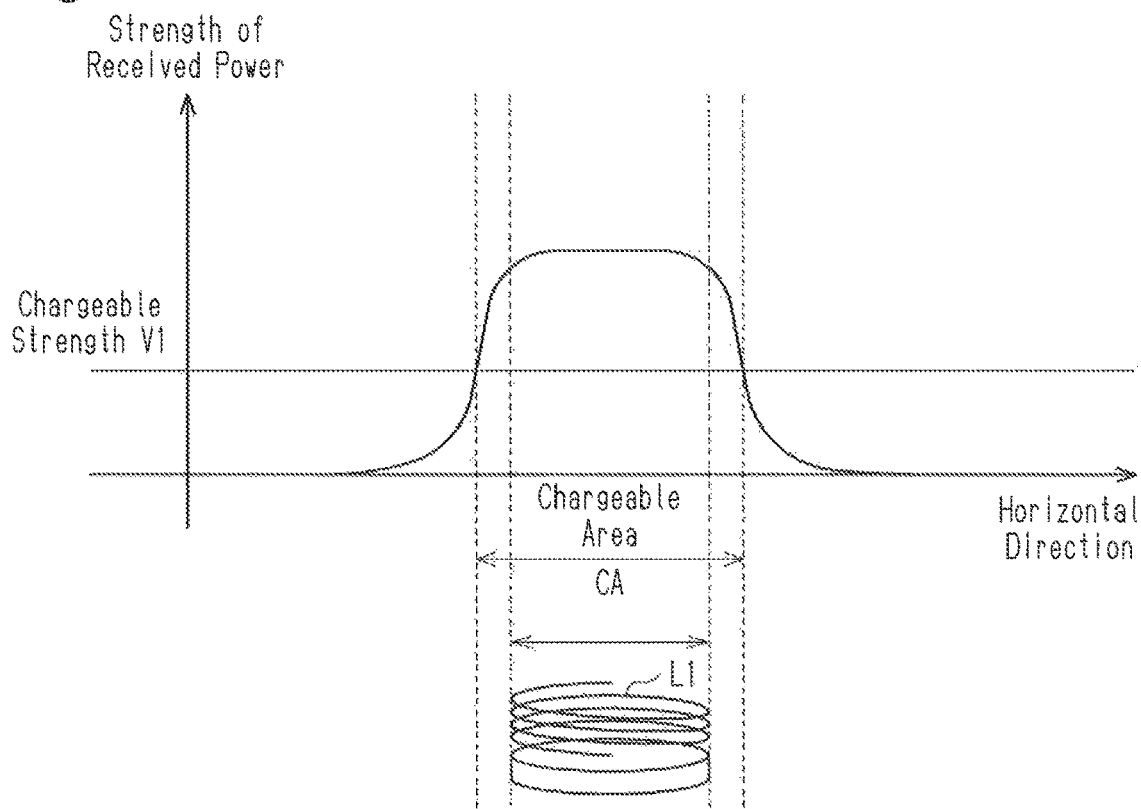
FIG. 3 is an explanatory graph showing alignment and charging strength of the vehicle shown in FIG. 2.

That is, as shown in FIG. 3, the electric power strength of the power transmitter coil L1 of the power transmission device 31 has a property to increase in a small area directly above the power transmitter coil L1 and a property to rapidly decrease when separated in the horizontal direction from the position directly above the power transmitter coil L1. The charging area guiding unit 28 generates guide information for guiding a driver to move the power receiver coil L2 to directly above the power transmitter coil L1 such that the strength of the electric power received by the power receiver coil L2 detected by the information detector 221 becomes, for example, greater than or equal to a chargeable strength V1, which serves as a threshold value that ensures sufficient strength for smooth charging. The charging area guiding unit 28 guides the driver via a non-illustrated display or an audio device provided in the passenger compartment of the vehicle 20 to navigate the vehicle 20 in accordance with the generated guide information. The vehicle 20 is navigated by the guidance such that the power transmitter coil L1 and the power receiver coil L2 face each other. As a result, the power receiver coil L2 installed in the vehicle 20 can be guided to a position within a range of a predetermined charging position CA, and electric power can be transmitted between the power transmitter coil L1 and the power receiver coil L2 with high efficiency.

As shown in FIG. 3, in the charging area BS in which the vehicle 20 enters, an area of the ground surface that accommodates the power transmitter coil L1 and has a diameter slightly greater than that of the power transmitter coil L1 is indicated as the predetermined charging position CA. At the charging position CA, the strength of signal by the electromagnetic induction or electromagnetic field resonance transmitted from the power transmitter coil L1 exceeds the chargeable strength V1. The strength of signal output from the power transmitter coil L1 rapidly falls if the vehicle 20 is misaligned with the charging position CA in a lateral direction (horizontal direction). As an example, a state in which the entire power receiver coil L2 is within the charging position CA, that is, a state in which the power receiver coil L2 is not even partially out of the electromagnetic coupling area is referred to as a state in which the power receiver coil L2 is located directly above the power transmitter coil L1. That is, when the power receiver coil L2 is located directly above the power transmitter coil L1, the power receiver coil L2 smoothly receives power supply from the power transmitter coil L1 by a signal strength greater than or equal to the chargeable strength V1.

The charging area guiding unit 28 determines the strength of signal output from the power transmitter coil L1 via the power receiver coil L2. If the signal strength is less than the chargeable strength V1, the charging area guiding unit 28 determines that the power receiver coil L2 is not located directly above the power transmitter coil L1 and the power receiver coil L2 is misaligned with the charging position CA. The charging area guiding unit 28 guides the driver based on the determination result to move the vehicle 20 toward the charging position CA. As described above, since the electric power output from the power transmitter coil L1 is received by only the power receiver coil L2 located in the immediate vicinity of the power transmitter coil L1 (in the charging position CA), influence of the power transmission to the surroundings is small.

Figure 4:
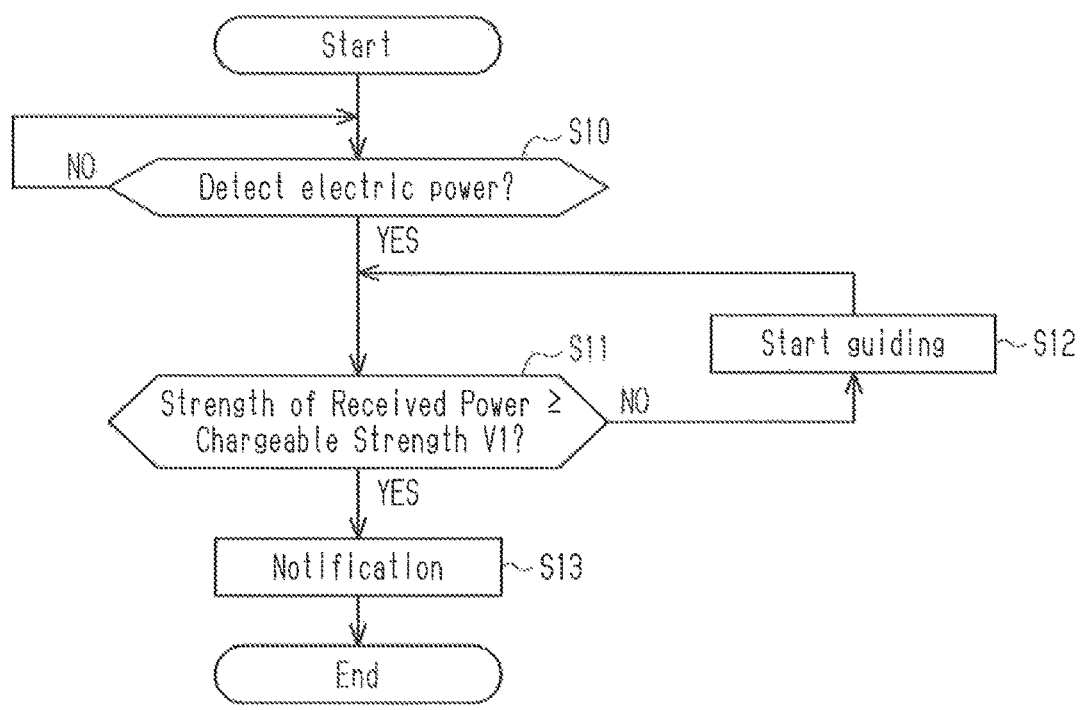
FIG. 4 is a flowchart showing a routine for aligning the vehicle shown in FIG. 2.

With reference to FIG. 4, the charging area guiding unit 28 first determines whether the information detector 221 has detected electric power at step S10. If the decision outcome is positive, it is determined whether the signal strength V detected by the information detector 221 has reached the chargeable strength V1 for transmitting electric power from the power transmitter coil L1 to the power receiver coil L2 (step S11). Consequently, if it is determined that the detected signal strength V has not reached the chargeable strength V1 as the result of the power receiver coil L2 of the vehicle 20 not located directly above the power transmitter coil L1 embedded in the ground surface, the charging area guiding unit 28 guides the driver of the vehicle 20 in a direction in which the signal strength V is increased. Thus, the driver of the vehicle 20 is guided by image display or audio output using, for example, a car navigation system, to navigate the vehicle 20 in a direction in which the signal strength V is increased (step S11; NO, step S12).

Through such guidance, when the power receiver coil L2 is guided to a position facing the power transmitter coil L1 so that the signal strength V becomes greater than or equal to the chargeable strength V1, the charging area guiding unit 28 notifies the driver of the vehicle 20 that the vehicle 20 is located in the predetermined position in the charging area BS (step S11: YES, step S13).

Since the vehicle 20 to be charged is guided to the predetermined position in the charging area BS in this manner, electric power is transmitted from the power transmitter coil L1 to the power receiver coil L2 appropriately and with high efficiency.

The wireless communication device 27 has a function to establish wireless communication and establishes wireless communication between the vehicle 20 and the power supply controller 10. The wireless communication established by the wireless communication device 27 differs from transferring of electric power between the power transmitter coil L1 and the power receiver coil L2 in the objective, the level, the frequency, and the modulation method of the transferred electric power. The wireless communication device 27 transmits, to the power supply controller 10, information about electric power including the specific pattern obtained from the electric power input to the vehicle 20 by a communication function controlled by the communication control unit 25, The communication control unit 25 controls transmission and reception of information by the wireless communication device 27.

The communication control unit 25 transmits a response signal that responds to a response request signal for vehicle detection transmitted by the power supply controller 10 and a connection response signal that responds to a connection request signal to the power supply controller 10 via the wireless communication device 27. The communication control unit 25 transmits information input from the charge control unit 22 such as a pattern information signal, information about charging electric power, and information about the charging state of the storage battery 24 to the power supply controller 10 via the wireless communication device 27. The pattern information signal is assigned to each station 30 by the power supply controller 10 and changes in the specific pattern. Furthermore, the pattern information signal is the information about the electric power obtained from the state of the electric power itself obtained from the electric power received via the power transmitter coil L1 and the power receiver coil 12.

After starting to charge, the communication control unit 25 receives electric power transmitted from the power supply controller 10 and information about a predicted time required for charging and outputs them to the charge control unit 22.

The communication control unit 25 determines whether the received communication is a communication designated to the vehicle 20 to which the communication control unit 25 belongs based on a vehicle ID and grants the vehicle ID to the information to be transmitted. Thus, the power supply controller 10 can identify the vehicle 20 that has transmitted the information.

As shown in FIG. 2, each station 30 adjusts electric power by the power transmission device 31 and transmits the adjusted electric power from the power transmitter coil L1. The power transmission device 31 receives electric power from a commercial power source and the electric power to be transmitted is controlled by the power supply controller 10. The power transmission device 31 outputs, to the power supply controller 10, various information about the electric power being supplied.

More specifically, the power transmission device 31 includes an electric power control unit 321, which converts electric power input from the commercial power source to electric power to be transmitted. The electric power control unit 321 converts electric power input from the commercial power source to electric power to be transmitted based on the control from the power supply controller 10 and outputs the converted electric power to the power transmitter coil L1. Thus, during charging by the power supplying apparatus, the electric power set by the electric power control unit 321 is transmitted to the power transmitter coil L1.

The electric power control unit 321 adjusts the voltage, the current, the cycle, and the phase of the AC power to be transmitted in accordance with the control of the power supply controller 10. Thus, electric power suitable for transmission from the power transmitter coil L1 is generated and supplied to the power transmitter coil L1. The electric power control unit 321 supplies electric power that changes in pulses to the power transmitter coil L1 by switching between supplying and stopping of the electric power. For example, the electric power control unit 321 supplies pulsed electric power of "one second" to the power transmitter coil L1 by controlling supplying and stopping of the electric power so as to supply electric power for only one second from a state in which the supply of electric power is stopped. The electric power control unit 321 can set the length of time period of the pulse, that is, the pulse width of the pulsed electric power to tens and thousands of the wavelength of the transmitted electric power and can set to a length at least equal to or greater than twice or three times the wavelength of the transmitted electric power. To be able to cope with various restrictions, for example, it is preferable to set to a pulse width that causes little radiation of high-frequency waves.

The power transmission device 31 detects electrical change that occurs in the electric power supplied to the power transmitter coil L1. For example, the power transmission device 31 detects electrical change in the voltage, the current, the cycle, and the phase of the electric power. Various information about the detected electric power is output to the power supply controller 10.

The power transmitter coil L1 is embedded in the ground surface corresponding to the charging area BS. When the vehicle 20 is located at the charging area BS, the power-transmitter coil L1 transmits electric power output from the power transmission device 31 to the power receiver coil L2 located on the lower section of the vehicle 20. The power receiver ceil L2 is electromagnetically coupled to the power transmitter coil L1 by being guided to a position facing the power transmitter coil L1. During transmission of electric power by the power transmission device 31, the power transmitter coil L1 transmits electric power to the power receiver coil L2 by electromagnetic induction or electromagnetic field resonance with the power receiver coil L2.

As shown in FIG. 2, the power supply controller 10 includes a power supply processor 11, which serves as a power supply control section for controlling electric power transmitted from the station 30, a wireless communication device 12, which serves as a communication section for allowing wireless communication between the power supply controller 10 and the vehicle 20, and a communication control unit 13, which controls communication of information to be transferred to and from the vehicle 20.

The wireless communication device 12 has a function to wirelessly communicate with the wireless communication device 27 of the vehicle 20 and establishes wireless communication between the power supply controller 10 and the vehicle 20. The wireless communication by the wireless communication device 12 also differs from the transfer of electric power between the power transmitter coil L1 and the power receiver coil L2 in the objective, and further differs in the level, the frequency, and the modulation method of the transferred electric power. The wireless communication device 12 receives, from the vehicle 20, the information about the electric power including the specific pattern obtained from the electric power and outputs the information about the received electric power to the communication control unit 13.

The communication control unit 13 controls transmission and reception of information by the wireless communication device 12. The communication control unit 13 receives information about electric power obtained from the state of electric power itself obtained from the electric power received via the power receiver coil L2, that is, information about the specific pattern transmitted from the vehicle 20 and outputs the received information to the power supply processor 11. The communication control unit 13 receives a response signal responding to a response request signal for detecting the vehicle, information about charging electric power, and information about charging state of the storage battery 24 transmitted from the vehicle 20 and outputs the received information to the power supply processor 11.

In contrast, the communication control unit 13 transmits information input from the power supply processor 11 such as a response request signal for detecting a vehicle, a connection request signal for establishing communication, and information about transmitted electric power and a predicted time required for charging to the vehicle 20 via the wireless communication device 12.

The information received by the communication control unit 13 is based on the vehicle ID. The communication control unit 13 grants a vehicle ID to the information to be transmitted. Thus, the vehicle 20 that should receive the information transmitted from the power supply controller 10 is identified.

The power supply processor 11 includes a vehicle detector 111, which detects a vehicle located in the charging area BS, and an alignment assisting unit 112, which assists in parking the vehicle at a certain position in the charging area BS. The power supply processor 11 further includes a pairing processor 113, which identifies the combination of the vehicle 20 and the charging area BS, and a power transmission control unit 114, which controls the transmitted electric power that charges the vehicle 20 parked in the charging area BS.

The vehicle detector 111 detects a vehicle located in any of the charging areas BS by wireless communication for detecting the vehicle. For example, the vehicle detector 111 periodically outputs a response request signal that includes the charging areas BS and its vicinity as a communication range and detects the vehicle 20 based on the response to the response request signal. Among the detected vehicles 20, the additionally detected vehicle 20 is detected as a new charging target. The communication range of the response request signal may be a range that does not include the outside of the stations, or a range that does not include a road along which a vehicle that will not enter the charging area BS moves.

When the power supply processor 11 detects the vehicle 20 that will be a new charging target with the vehicle detector 111, the power supply processor 11 starts operation of the alignment assisting unit 112 for the detected vehicle 20.

The alignment assisting unit 112 controls the associated station 30 to allow the charging area BS not used for charging, or a vacant charging area BS, to supply electric power having an alignment pattern. Thus, electric power having the alignment pattern is transmitted from the power transmitter coil L1 of the station 30 corresponding to the vacant charging area BS. The alignment pattern is electric power that maintains a constant strength.

The alignment assisting unit 112 obtains information about the state of the transmitted electric power from the station 30 that is controlled by the alignment assisting unit 112 to transmit electric power having the alignment pattern. For example, the alignment assisting unit 112 obtains, as the information about the state of the transmitted electric power, changes in the voltage or current of the transmitted electric power and changes in the impedance of the power transmitter coil L1 from the station 30. Based on the information about the transmitted electric power, the alignment assisting unit 112 detects that the power receiver coil L2 is electrically connected to the power transmitter coil L1, or that the power receiver coil L2 of the vehicle 20 is located directly above the power transmitter coil L1 of the charging area BS. The alignment assisting unit 112 is capable of detecting that the power receiver coil L2 is located directly above the power transmitter coil L1 based on, for example, the fact that the voltage or the current of the transmitted electric power is equal to a predetermined value or that the impedance of the power transmitter coil L1 is equal to a predetermined value. For example, the alignment assisting unit 112 determines the strength of electric power received by the power receiver coil L2 from the electric power transmitted to the power transmitter coil L1. If it is determined that the strength of the electric power is less than the chargeable strength V1, the alignment assisting unit 112 determines that the power receiver coil L2 Is not located directly above the power transmitter coil L1 and the power receiver coil L2 is misaligned with the charging position CA. In contrast, if it is determined that the strength of electric power is greater than or equal to the chargeable strength V1, the alignment assisting unit 112 is also capable of detecting that the power receiver coil L2 is located directly above the power transmitter coil L1, that is, the power receiver coil L2 is located in the range of the charging position CA.

In this manner, since the electric power transmitted from the power transmitter coil L1 is received only by the power receiver coil L2 located in the immediate vicinity of the power transmitter coil L1 (the charging position CA), influence of such a power transmission to the surroundings is small.

If the alignment assisting unit 112 detects that the power receiver coil L2 is located directly above the power transmitter coil L1, the alignment assisting unit 112 stops outputting electric power having the alignment pattern from the station 30 and causes the pairing processor 113 to start a pairing process. That is, the alignment assisting unit 112 is a second part of the power supply control section and is configured to set the pattern of electric power transmitted from a power transmitter to the alignment pattern.

Since the alignment assisting unit 112 detects the completion of alignment for each of the stations 30, the alignment assisting unit 112 stops transmission of electric power having the alignment pattern from the station 30 in which the completion of alignment is detected. If the alignment assisting unit 112 detects the completion of alignment the same number of times as the number of detected additional vehicles 20, the alignment assisting unit 112 stops transmission of electric power having the alignment pattern from other stations 30 that output electric power having the alignment pattern. The electric power required for alignment is reduced by stopping the power transmission in accordance with the completion of alignment as described above.

The pairing processor 113 causes the charging area BS not used for charging, that is, the charging area BS not performing a charging process to supply electric power having a specific pattern for pairing that has a pattern different from the above-mentioned alignment pattern. That is, if there are several vacant charging areas BS, the pairing processor 113 controls the stations 30 to transmit electric power having specific patterns for pairing that are different from each other. Thus, each of the vacant charging areas BS transmits electric power having the specific pattern for pairing from the power transmitter coil L1 of the station 30 corresponding to the charging area BS. That is, the pairing processor 113 is a first part of the power supply control section and is configured to set the patterns of electric powers transmitted from multiple power transmitters to specific patterns that vary from one power transmitter to another.

The pairing processor 113 receives, via the wireless communication device 12, information about the specific pattern of the electric power received by each vehicle 20 that is transmitted from the vehicle 20 (receiving step). The pairing processor 113 compares the electric power having the specific pattern transmitted from each station 30 with the information about the specific pattern of the electric power received by each vehicle 20 and determines whether the specific patterns are the same. If it is determined that the specific patterns are the same, that is, the specific patterns match each other, the pairing processor 113 determines that the station 30 and the vehicle 20 are the combination to be charged in a noncontact manner and pairs the station 30 with the vehicle 20 (determining step). If it is determined that the specific patterns are not the same, the pairing processor 113 repeats comparing the station 30 with the specific pattern of other vehicles 20 or comparing the vehicle 20 with other stations 30 until the same specific patterns are found.

Figures 5, 6:
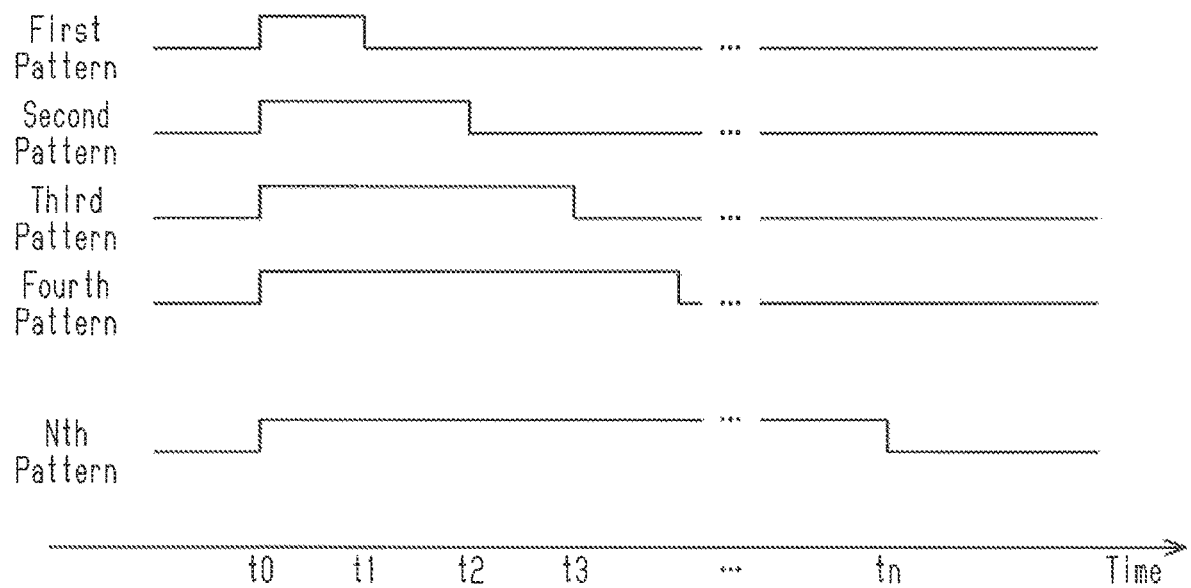
FIG. 5 is a timing chart showing specific patterns for pairing transmitted from the multiple charging areas shown in FIG. 1.
FIG. 6 is a map assigning the specific patterns shown in FIG. 5 to multiple charging areas.

As shown in FIG. 5, in the present embodiment, the specific pattern for pairing is a step waveform pattern, or a rectangular pulse. Since the transmitted electric power is AC power, the pattern of the detected electric power appears on the positive and negative sides, that is, above and below zero. However, for the purpose of illustration, only the upper portions are shown. Multiple patterns including a first pattern to an nth pattern are set as the specific patterns, and each pattern is set such that the length of the time period (the pulse width) differs from each other. For example, the length of the time period of the step in the first pattern is set to a length from time t0 to time t1, the length of the step in the second pattern is set to a length from time t0 to time t2, and the length of the step in the third pattern is set to a length from time t0 to time t3. For example, the length of the step in the fourth pattern is set to a length from time t0 to time t4, and the length of the step in the nth pattern is set to a length from time t0 to time tn. The elapsed time from time t0 is set such that t1<t2<t3<t4< . . . <tn so that the lengths of the time period of the steps in the patterns from, the first pattern to the nth pattern differ from each other. For example, when time t0 is "0 seconds", the time t1 is set to "one second," the time t2 is set to "two seconds", the time t3 is set to "three seconds", the time t4 is set to "four seconds", and the time tn is set to "n seconds". The pulse width may be shorter than one second or may be longer than five seconds. However, radiation of high-frequency waves is reduced with the pulse width greater than or equal to one second.

The pairing processor 113 assigns the specific pattern for pairing (setting step) to the charging area BS. At this time, if multiple charging areas BS are vacant, the pairing processor 113 assigns different specific patterns to the vacant charging areas BS. When multiple specific patterns are assigned, the pairing processor 113 preferentially assigns a pattern with a shorter length of step.

FIG. 6 shows specific patterns assigned by the pairing processor 113. For example, a case in which a first to fifth charging areas BS1 to BS5 are vacant will be described. At this time, the pairing processor 113 assigns the first pattern to the first charging area BS1, the second pattern to the second charging area BS2, the third pattern to the third charging area BS3, the fourth pattern to the fourth charging area BS4, and the fifth pattern to the fifth charging area BS5 (pattern 1).

For example, if the second, fourth, and fifth charging areas BS2, BS4, BS5 are vacant, that is, if the first and third charging areas BS1, BS3 are occupied, the pairing processor 113 assigns the first pattern to the second charging area BS2, the second pattern to the fourth charging area BS4, and the third pattern to the fifth charging area BS5 (pattern 2).

For example, if the fourth and fifth charging areas BS4, BS5 are vacant, that is, if the first to third charging areas BS1 to BS3 are occupied, the pairing processor 113 assigns the first pattern to the fourth charging area BS4 and the second pattern to the fifth charging area BS5 (pattern 3).

As described above, the pairing processor 113 preferentially assigns a step with a short period of time to the vacant charging area BS as the specific pattern for pairing so that the time required for supplying electric power for pairing is reduced. For example, in the pattern assignment shown in FIG. 6, while the pattern 1 requires five seconds at the maximum for transmission of the specific patterns, the pattern 2 reduces the power transmission to three seconds sit the maximum, and the pattern 3 reduces the power transmission to two seconds at the maximum. Thus, the time required for the pairing process is reduced.

If the vehicle 20 receives the pattern of the electric power for pairing, the charge control unit 22 of the vehicle 20 detects the length of the time period of the step in the received electric power and transmits, to the power supply controller 10, the length of the step as the information about the pattern of the received electric power together with the information for identifying the vehicle, such as the vehicle ID.

The pairing processor 113 identifies the combination of each station 30 and the corresponding vehicle 20 based on the information about the pattern of the electric power transmitted from the vehicle 20, the information for identifying the vehicle 20, and the specific pattern assigned to the station 30.

For example, if the pairing processor 113 instructs the charging areas to transmit power in accordance with the pattern 1, the pairing processor 113 associates the vehicle ID of the vehicle 20 that has transmitted "one second" or an approximate value as the information about the pattern of the electric power with the first station 301. Similarly, the pairing processor 113 associates the vehicle ID of the vehicle 20 that has transmitted "two seconds" or an approximate value with the second station 302, and the vehicle ID of the vehicle 20 that has transmitted "three seconds" or an approximate value with the third station 303. Similarly, the pairing processor 113 associates the vehicle ID of the vehicle 20 that has transmitted "four seconds" or an approximate value with the fourth station 304, and the vehicle ID of the vehicle 20 that has transmitted "five seconds" or an approximate value with the fifth station 305.

For example, if the pairing processor 113 instructs the charging areas to transmit power in accordance with the pattern 2, the pairing processor 113 associates the vehicle ID of the vehicle 20 that has transmitted "one second" or an approximate value as the information about the pattern of the electric power with the second station 302. Similarly, the pairing processor 113 associates the vehicle ID of the vehicle 20 that has transmitted "two seconds" or an approximate value with the fourth station 304, and the vehicle ID of the vehicle 20 that has transmitted "three seconds" or an approximate value with the fifth station 305.

For example, if the pairing processor 113 instructs the charging areas to transmit power in accordance with the pattern 3, the pairing processor 113 associates the vehicle ID of the vehicle 20 that has transmitted "one second" or an approximate value as the information about the pattern of the electric power with the fourth station 304. Similarly, the pairing processor 113 associates the vehicle ID of the vehicle 20 that has transmitted "two seconds" or an approximate value with the fifth station 305.

The pairing processor 113 associates each vehicle 20 located at the charging area BS with the station 30 that supplies electric power to the charging area BS through the pairing process and stores the vehicle 20 and the associated station 30. Thus, the power supply processor 11 determines the electric power to be supplied to the vehicle 20 based on information such as the remaining power of the storage battery 24 obtained from the vehicle 20 via the wireless communication devices 27, 12 and controls the associated, power transmission device 31 of the station 30 to transmit the determined electric power. Thus, the electric power suitable for charging the storage battery 24 of the vehicle 20 is transmitted to the vehicle 20 from the associated power transmission device 31.

The power supply controller 10 supplies electric power from the associated power transmission device 31 by electric power control based on the pairing established between the vehicle 20 and the station 30.

The power transmission control unit 114 sets the condition for charging the vehicle 20 that is associated with the station 30 by the pairing processor 113 based on the information about the charging condition set in the power supply processor 11. If the power transmission control unit 114 obtains, for example, the remaining power of the storage battery 24 based on the information about charging of the vehicle 20 transferred via the wireless communication device 12, the power transmission control unit 114 calculates the time required to complete charging and transmits the calculated time required to complete charging to the vehicle 20 via the wireless communication device 12. The vehicle 20, for example, displays the received information on a display such as a car navigation system. Similarly, if the power transmission control unit 114 determines that charging of the storage battery 24 is completed based on the obtained remaining power of the storage battery 24, the power transmission control unit 114 stops transmitting electric power to the vehicle 20.

Next, referring to FIGS. 7 to 10, operation of the non-contact charging system according to the present embodiment will be described. For convenience of description, the power supply controller 10 controls transmission of power for charging from the first to third stations 301 to 303. Assume that the first and second vehicles 201, 202 have additionally entered the charging areas including the first to third stations 301 to 303 for charging substantially at the same time. The first vehicle 201 parks in the first station 301 for charging, and the second vehicle 202 parks in the second station 302 for charging.

Figure 7:
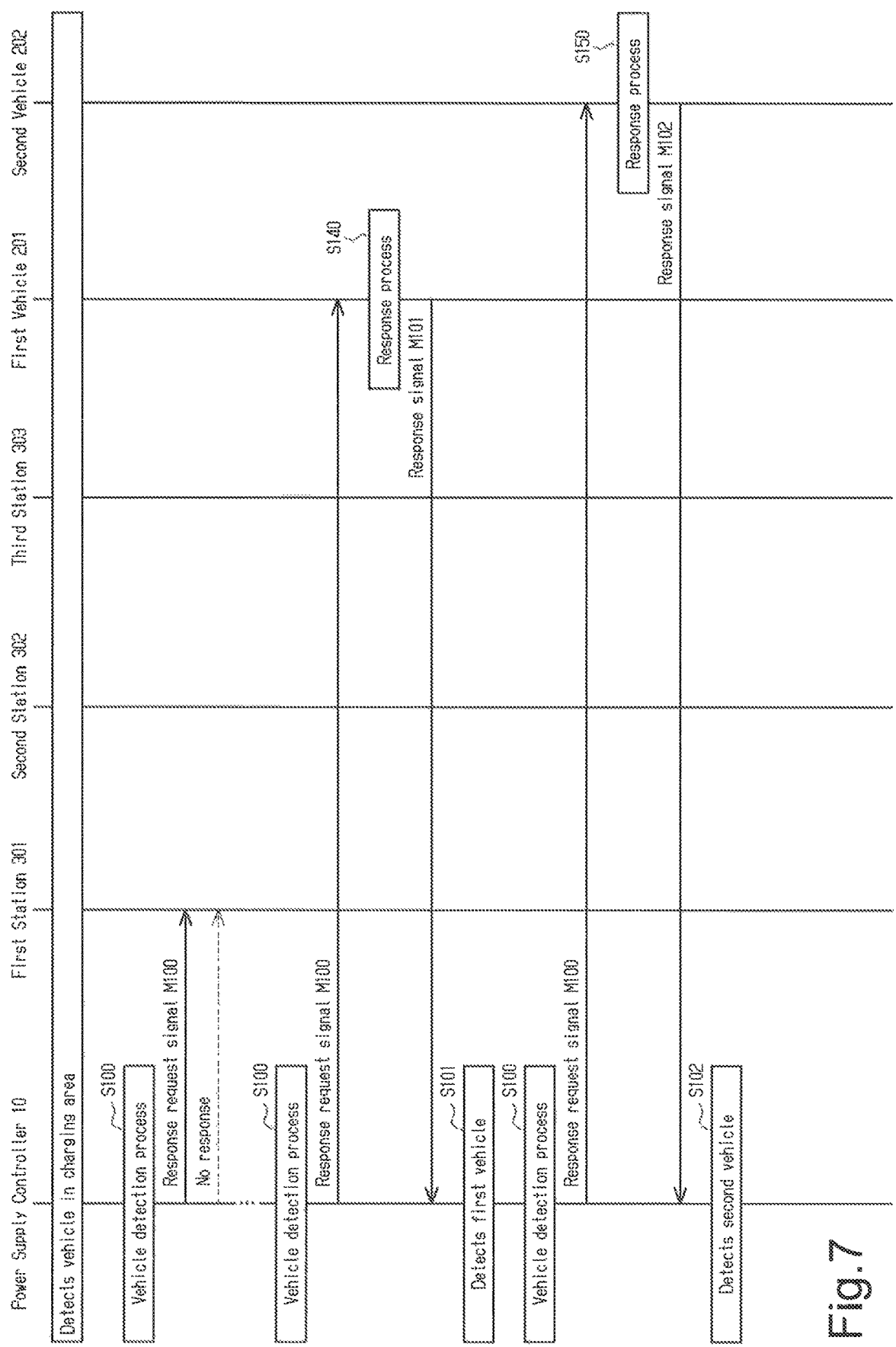
FIG. 7 is a sequence chart showing a routine for detecting vehicles in the charging areas shown in FIG. 1.

As shown in FIG. 7, since the non-contact charging system detects the additional vehicles 20 that have entered the charging area, the non-contact charging system performs a process for detecting a vehicle in the charging area.

In the process for detecting a vehicle in the charging area, the power supply controller 10 outputs, as the vehicle detection process, a response request signal M100 via the wireless communication device 12 to the charging areas BS controlled by the power supply controller 10 and its proximity at predetermined time intervals (step S100 of FIG. 7).

The response request signal M100 is a signal transmitted by the power supply controller 10 without designating a receiver, and the receiver processes as required and responds back. If there is no response to the response request signal M100, the power supply controller 10 determines that there is no additional vehicle 20 entering the charging area. The vehicle 20 that is being charged does not necessarily have to respond to the response request signal M100. Even if the vehicle 20 that is being charged responds back, the power supply controller 10 can determine that the vehicle 20 is being charged and is not the additionally entered vehicle 20 from the vehicle ID of the vehicle.

Assume that the additional first vehicle 201 enters the charging area when the power supply controller 10 outputs the response request signal M100 (step S100 of FIG. 7). The first vehicle 201 receives the response request signal M100 and returns a response signal M101, which is a response to the received response request signal M100 (step S140 in FIG. 7). The power supply controller 10 that has received the response signal M101 via the wireless communication device 12 detects that the first vehicle 201 has additionally entered the charging area (step S101 of FIG. 7). Assume that the additional second vehicle 202 enters the charging area when the power supply controller 10 outputs the response request signal M100 (step S100 in FIG. 7). The second vehicle 202 receives the response request signal M100 and returns a response signal M102, which is a response to the received response request signal M100 (step S150 of FIG. 7). The power supply controller 10 that has received the response signal M102 via the wireless communication device 12 detects that the second vehicle 202 has additionally entered the charging area (step S102 of FIG. 7).

Figure 8:
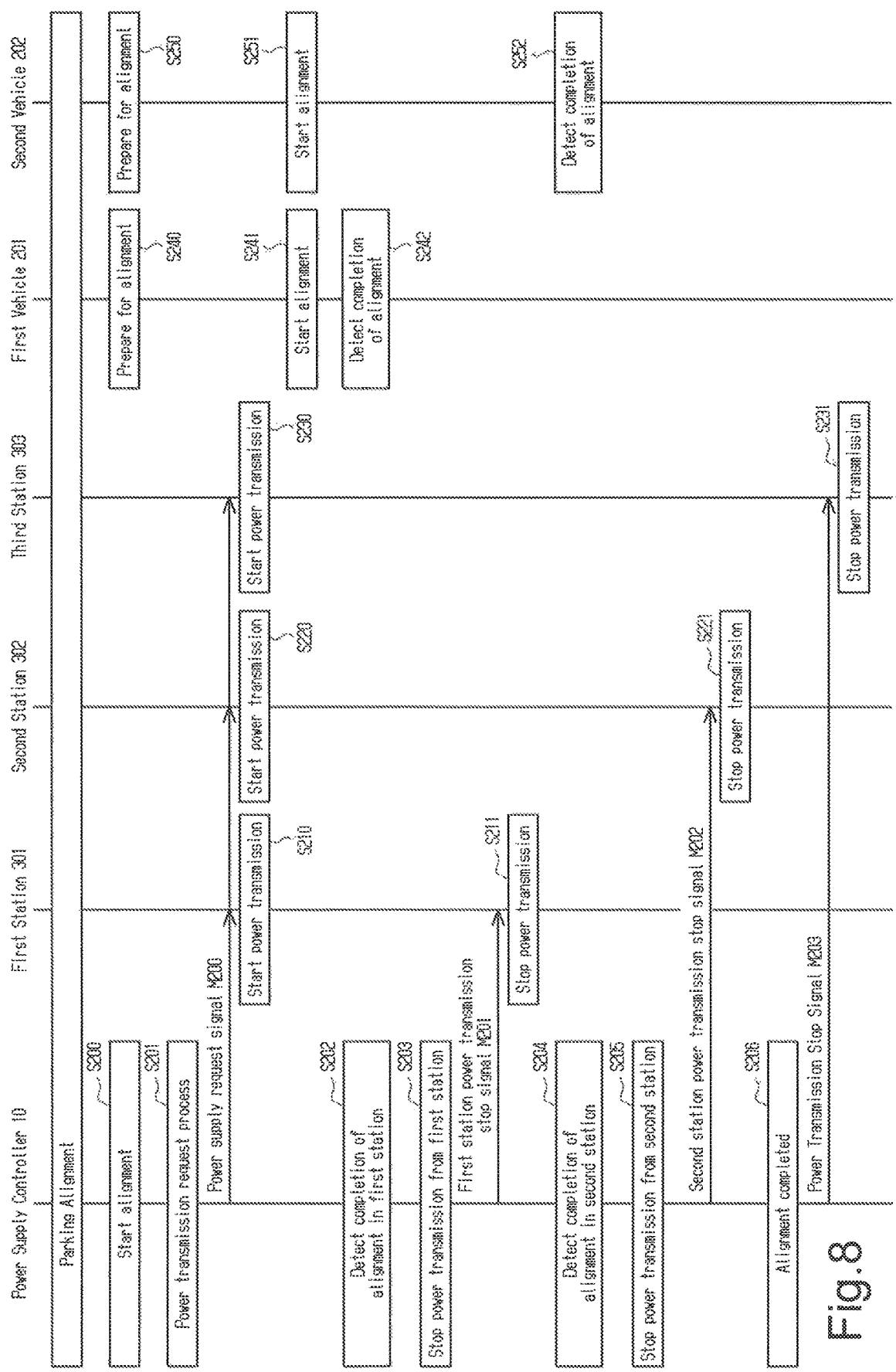
FIG. 8 is a sequence chart showing a routine for aligning the vehicles continued from FIG. 7.

As shown in FIG. 8, when the power supply controller 10 detects that the first vehicle 201 and the second vehicle 202 have additionally entered the charging area, the power supply controller 10 starts a process for parking alignment (step S200 of FIG. 8). The first vehicle 201 and the second vehicle 202 start preparing for alignment after responding to the response request signal M100 (steps S240, S250 of FIG. 8).

When the process for parking alignment is started, the power supply controller 10 performs a process to request power transmission to the first to third stations 301 to 303 (step S201 of FIG. 8). In the power transmission request process, the power supply controller 10 outputs, to the first to third stations 301 to 303, a power transmission request signal M200 for electric power having an alignment pattern. When the power transmission request signal M200 output from the power supply controller 10 is input to the first to third stations 301 to 303, the first to third stations 301 to 303 start transmitting electric power having the alignment pattern in response to the power transmission request signal M200 (steps S210, S220, S230 of FIG. 8). When, transmission of electric power having the alignment pattern from the first to third stations 301 to 303 is started, the first and second vehicles 201, 202, which receive the electric power, start alignment such that the received electric power has a strength greater than or equal to the chargeable strength V1 (steps S241, S251 of FIG. 8). When the received electric power has a strength that is greater than or equal to the chargeable strength V1, the first and second vehicles 201, 202 detect the completion of the alignment (steps S242, S252 of FIG. 8). In response to detection of the completion of alignment, the first and second vehicles 201, 202 notify drivers in the vehicles that the alignment has been completed.

The power supply controller 10 detects that either of the first and second vehicles 201, 202 is aligned in any of the first to third stations 301 to 303 based on the information about the transmitted electric power detected by the first to third stations 301 to 303.

For example, the power supply controller 10 detects that the first vehicle 201 is aligned in the first station 301 based on the information about the transmitted electric power from the first station 301 (step S202 of FIG. 8). The power supply controller 10 outputs a first station power transmission stop signal M201, which stops the power transmission from the first station 301, to the first station 301 in response to the completion of the alignment of the first vehicle 201 (step S203 of FIG. 8). Thus, the first station 301, which has received the first station power transmission stop signal M201, stops transmitting electric power having the alignment pattern (step S211 of FIG. 8).

For example, the power supply controller 10 detects that the second vehicle 202 is aligned in the second station 302 based on the information about the transmitted electric power from the second station 302 (step S204 of FIG. 8). The power supply controller 10 outputs a second station power transmission stop signal M202, which stops the power transmission from the second station 302, to the second station 302 in response to the completion of the alignment of the second vehicle 202 (step S205 of FIG. 8). Thus, the second station 302, which has received the second station power transmission stop signal M202, stops transmitting the electric power having the alignment pattern (step S221 of FIG. 8).

Thus, the power supply controller 10 determines that the alignment of the additionally entered two vehicles 20 has been completed and outputs a power transmission stop signal M203 for stopping transmission of electric power having the alignment pattern to the remaining third station 303 (step S206 of FIG. 8). Thus, the third station 303, which has received the power transmission stop signal M203, stops transmitting electric power (step S231 of FIG. 8). Thus, the power supply controller 10 ends alignment of the two vehicles 20.

Figure 9:
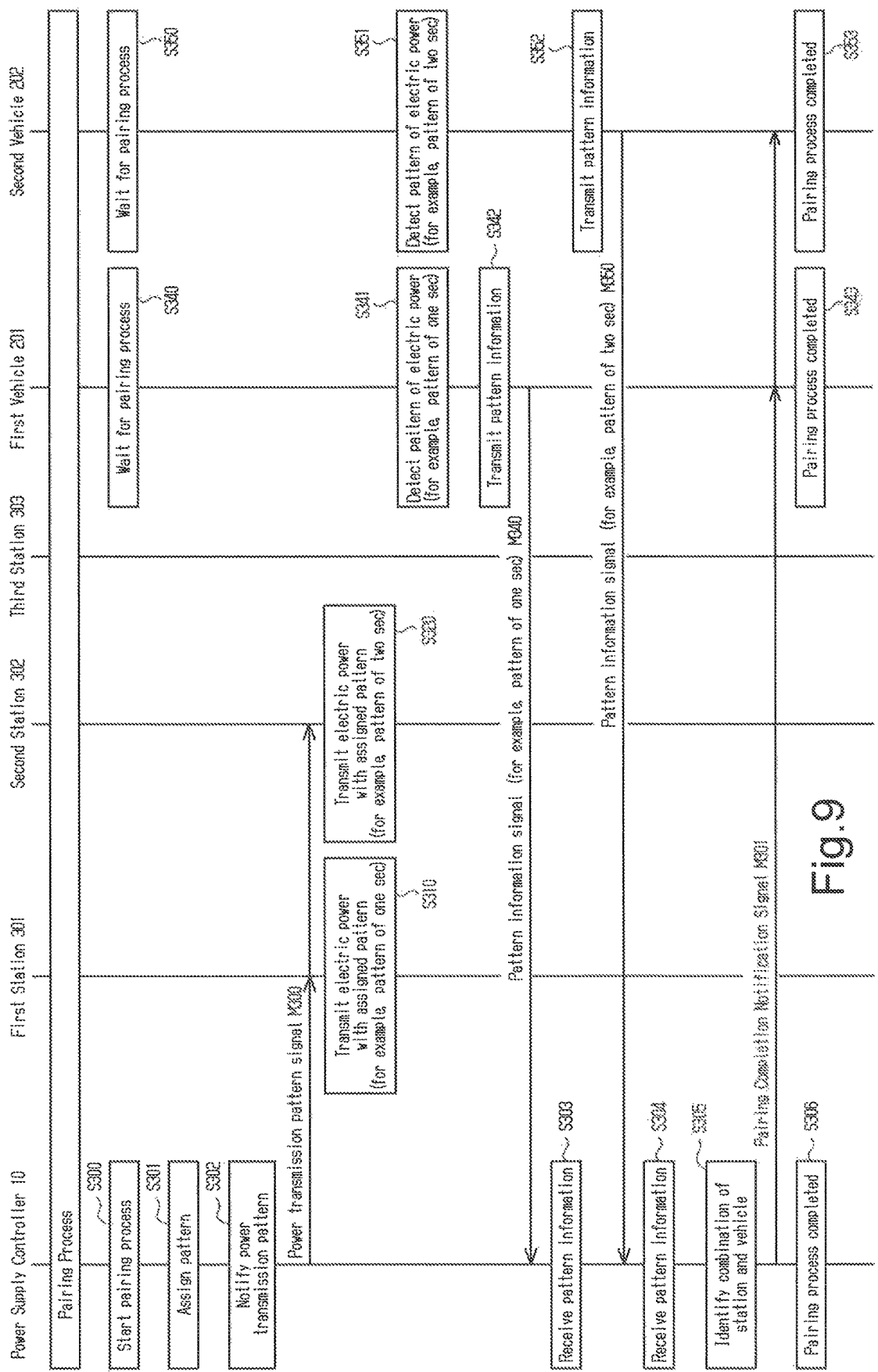
FIG. 9 is a sequence chart showing a routine for pairing the vehicles and the charging areas continued from FIG. 8.

As shown in FIG. 9, when the parking alignment process ends, the power supply controller 10 starts a pairing process (step S300 of FIG. 9). The first and second vehicles 201, 202 wait for start of the pairing process (step S340, S350 of FIG. 9) in response to detection of the completion of the alignment (steps S202, S252 of FIG. 8).

When the pairing process is started, the power supply controller 10 assigns a specific pattern to be granted to electric power for pairing to the station 30 in which either of the vehicles 20 is detected (step S301 of FIG. 9). For example, the power supply controller 10 assigns a pattern having a step waveform with a length of "one second" to the first station 301, and a pattern having a step waveform with a length of "two seconds" to the second station 302. The power supply controller 10 does not assign a specific pattern for a pairing process to the third station 303 in which no vehicle 20 is aligned.

When the specific patterns to be assigned to the first and second stations 301, 302 are determined, the power supply controller 10 outputs a power transmission pattern signal M300, which notifies the specific pattern for pairing to the first and second stations 301, 302 (step S302 of FIG. 9). The first and second stations 301, 302, which have received the power transmission pattern signal M300, start transmitting power in accordance with the assigned power transmission pattern. For example, the first station 301, to which a pattern having a step waveform with a length of "one second" is assigned, transmits (outputs) electric power having a step waveform with a length of "one second" from the power transmitter coil L1 (step S310 of FIG. 9). For example, the second station 302, to which a pattern having a step waveform with a length of "two seconds" is assigned, transmits (outputs) electric power having a step waveform with a length of "two seconds" from the power transmitter coil L1 (step S320 of FIG. 9). That is, a pulse having a pulse width of one second is output from the power transmitter coil L1 of the first station 301, and a pulse having a pulse width of two seconds is output from the power transmitter coil L1 of the second station 302.

At this time, in the present embodiment, electric powers having specific patterns are simultaneously output from the stations as shown in FIG. 5. Since the electric powers having specific patterns different from each other are output, even if the electric powers are output from the power transmitters at a timing at which the output periods of the specific patterns at least partially overlap, it is possible to pair each device to be charged with the associated power transmitter. That is, the time required for pairing is reduced since pairing is favorably performed even if electric powers having specific patterns are output simultaneously and at the same period from the power transmitters. Electric powers having specific patterns can be output from the stations in such a manner that the electric powers overlap.

When the power receiver coil L2 of the first vehicle 201 waiting for the pairing process receives the electric power, the first vehicle 201 detects information about the pattern of the received electric power. For example, the first vehicle 201 detects that the supply time was "one second" as the pattern of the received electric power. The first vehicle 201 transmits a pattern information signal M340, which includes the fact that the supply time of the electric power was "one second," to the power supply controller 10 via the wireless communication device 27 (step S342 in FIG. 8). The transmitted pattern information signal M340 is received by the power supply controller 10 (step S303 of FIG. 9). Similarly, for example, the second vehicle 202 detects that the supply time was "two seconds" as the pattern of the received electric power. The second vehicle 202 transmits a pattern information signal M350, which includes the fact that the supply time of the electric power was "two seconds," to the power supply controller 10 via the wireless communication device 27 (step S352 of FIG. 3). The transmitted pattern information signal M350 is received by the power supply controller 10 (step S304 of FIG. 9).

The power supply controller 10, which has received the pattern information signal M340 from the first vehicle 201 and the pattern information signal M350 from the second vehicle 202, identifies the combinations of the stations 30 and the vehicles 20 (step S305 of FIG. 9). For example, the power supply controller 10 determines that the first vehicle 201 has received electric power for pairing from the first station 301 since the specific pattern assigned to the first station 301 is a step waveform of "one second" and the pattern information signal M340 from the first vehicle 201 indicates that the supply time is "one second". Thus, the power supply controller 10 pairs the first vehicle 201 with the first station 301. For example, the power supply controller 10 determines that the second vehicle 202 has received electric power for pairing from the second station 302 since the specific pattern assigned to the second station 302 is a step waveform of "two seconds" and the pattern information signal M350 from the second vehicle 202 indicates that the supply time is "two seconds". Thus, the power supply controller 10 pairs the second vehicle 202 with the second station 302.

Thus, the power supply controller 10 ends the pairing of the two vehicles 20 that have additionally entered the charging areas BS (step S306 of FIG. 9).

The power supply controller 10 transmits a pairing completion notification signal M301 as a signal to be transmitted from the wireless communication device 12 without specifying the destination. The first vehicle 201 and the second vehicle 202, which have received the pairing completion notification signal M301, recognize the end of the pairing process (steps S343, S353 of FIG. 9).

Figure 10:
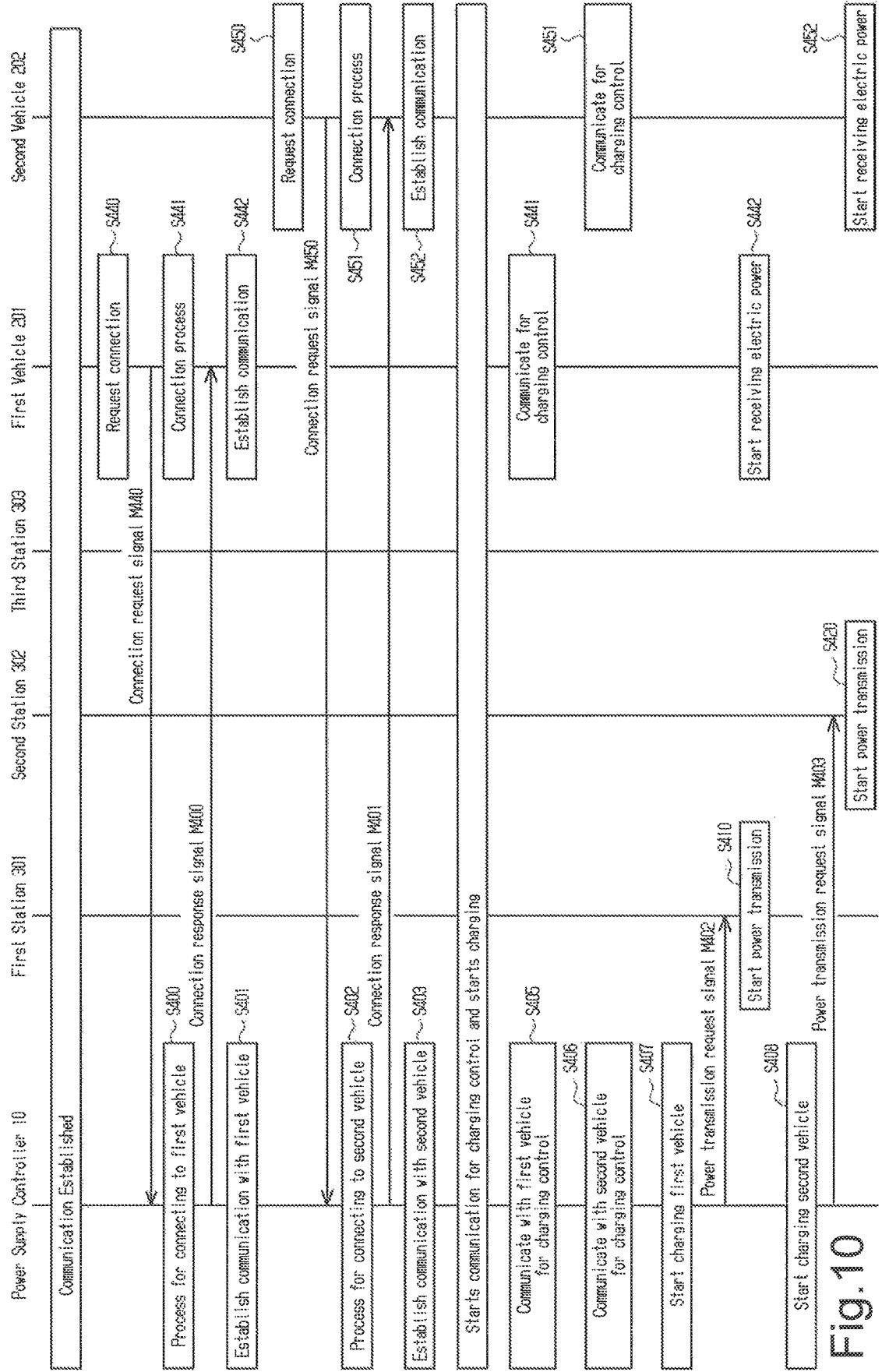
FIG. 10 is a sequence chart showing a routine for establishing communication between the vehicles and the charging areas continued from FIG. 9.

As shown in FIG. 10, when the pairing ends, communication between the power supply controller 10 and each vehicle 20 is established. For example, upon recognition of the end of the pairing process, the first vehicle 201 transmits a connection request signal M440 to the power supply controller 10 via the wireless communication device 27 (step S440 of FIG. 10) and performs a connection process (step S441 of FIG. 10). The power supply controller 10, which has received the connection request signal M440 from the first vehicle 201, performs a process to establish communication between the first vehicle 201 and the first station 301, which corresponds to the first vehicle 201. When the process for establishing the communication ends, the power supply controller 10 transmits a connection response signal M400 to the first vehicle 201 via the wireless communication device 12 (step S400 of FIG. 10). Thus, the power supply controller 10 establishes communication with the first vehicle 201 (step S401 of FIG. 10). That is, the first vehicle 201, which has performed the connection process and received the connection response signal M400, establishes communication with the power supply controller 10 (step S442 of FIG. 10). For example, upon recognition of the end of the pairing process, the second vehicle 202 transmits a connection request signal M450 to the power supply controller 10 via the wireless communication device 27 (step S450 of FIG. 10) and performs a connection process (step S451 of FIG. 10). The power supply controller 10, which has received the connection request signal M450 from the second vehicle 202, performs a process to establish communication between the second vehicle 202 and the second station 302, which corresponds to the second vehicle 202. When the process for establishing the communication ends, the power supply controller 10 transmits a connection response signal M401 to the second vehicle 202 via the wireless communication device 12 (step S402 of FIG. 10). Thus, the power supply controller 10 establishes communication with the second vehicle 202 (step S403 of FIG. 10). That is, the second vehicle 202, which has performed the connection process and received the connection response signal M401, also establishes communication, with the power supply controller 10 (step S452 of FIG. 10).

Since the communication is established as described above, for example, the power supply controller 10 can obtain the remaining battery charge of the storage battery 24 in the first vehicle 201 from the paired first vehicle 201 in order to control the electric power to be transmitted from the first station 301. For example, the power supply controller 10 can obtain the remaining battery charge of the storage battery 24 in the second vehicle 202 from the paired second vehicle 202 in order to control the electric power to be transmitted from the second station 302.

As shown in FIG. 10, when the communication between the first station 301 and the first vehicle 201 and the communication between the second station 302 and the second vehicle 202 are established, the power supply controller 10 starts communication for charging control and starts charging.

The power supply controller 10 and the first vehicle 201 perform communication for charging control via the wireless communication devices 12, 27 (steps S405, S441 of FIG. 10). Through the communication for charging control, the power supply controller 10 obtains information about the remaining battery charge of the storage battery 24 from the first vehicle 201. In contrast, through the communication for charging control, the first vehicle 201 obtains, from the power supply controller 10, information about the charging time and the charging electric power amount of the storage battery 24 of the first vehicle 201 calculated by the power supply controller 10.

Similarly, the power supply controller 10 and the second vehicle 202 perform communication for charging control via the wireless communication devices 12, 27 (steps S406, S451 of FIG. 10). Through the communication for charging control, the power supply controller 10 obtains information about the remaining battery charge of the storage battery 24 from the second vehicle 202. In contrast, through the communication for charging control, the second vehicle 202 obtains, from the power supply controller 10, information about the charging time and the charging electric power amount of the storage battery 24 of the second vehicle 202 calculated by the power supply controller 10.

The power supply controller 10 calculates the appropriate power transmission amount based on the remaining battery charge of the storage battery 24 in the first vehicle 201 obtained through the communication for charging control and starts charging the first vehicle 201 from the first station 301 by outputting the calculated power transmission amount as a power transmission request signal M402 to the first station 301 (step S407 of FIG. 10). That is, the first station 301, which has received the power transmission request signal M402, starts transmitting electric power from the power transmitter coil L1 (step S410 of FIG. 10) by supplying the electric power to be transmitted that is generated by an electric power transmitter 32 to the power transmitter coil L1 in response to the received power transmission request signal M402. The power receiver coil L2 of the first vehicle 201 located to face the power transmitter coil L1 starts to receive the electric power transmitted from the power transmitter coil L1, and the storage battery 24 of the first vehicle 201 is charged by the electric power that is started to be received (step S442 of FIG. 10).

Similarly, the power supply controller 10 calculates the appropriate power transmission amount based on the remaining battery charge of the storage battery 24 in the second vehicle 202 obtained through the communication for charging control and starts charging the second vehicle 202 from the second station 302 by outputting the calculated power transmission amount as a power transmission request signal M403 to the second station 302 (step S408 of FIG. 10). That is, the second station 302, which has received the power transmission request signal M403, starts transmitting electric power from the power transmitter coil L1 (step S420 of FIG. 10) by supplying the electric power to be transmitted that is generated by the electric power transmitter 32 to the power transmitter coil L1 in response to the received power transmission request signal M403. The power receiver coil L2 of the second vehicle 202 located to face the power transmitter coil L1 starts to receive the electric power transmitted from the power transmitter coil L1, and the storage battery 24 of the second vehicle 202 is charged by the electric power that is started to be received (step S452 of FIG. 10).

The non-contact charging system according to the present embodiment achieves the following advantages.

(1) The specific pattern for pairing varies from one power transmission device 31 (station 30) to another. Thus, the power transmission device 31 and the vehicle 20 that corresponds to the power transmission device 31 are identified, or paired, based on the specific pattern, which varies from one power transmission device 31 to another. As a result, the power transmission device 31 and the vehicle 20 are favorably paired.

Communication equipment for pairing does not need to be provided separately. Thus, the system prevents reduction in the space for the power supply processor 11 (the power supply controller 10) and the vehicles 20.

With the above-described pairing, the power supply processor 11 (the power supply controller 10) charges the storage battery 24 in a suitable manner based on the state of the storage battery 24 obtained through the communication.

(2) The vehicle 20 equipped with the storage battery 24 can be parked at a position that allows the vehicle 20 to favorably transfer electric power by the alignment based on the electric power having the alignment pattern. Since the vehicle 20 is aligned in this manner, any electric power including the electric power having the specific pattern used for pairing can be favorably transmitted and received.

(3) The pattern of electric power suitable for alignment is set in addition to the specific pattern for pairing. Thus, alignment is also performed in a suitable manner. As the pattern of the electric power suitable for alignment, the electric power preferably has a constant electric power strength such that the vehicle 20 receives the electric power in a stable manner.

(4) When the power supply controller 10 detects the completion of the alignment, pairing is performed in a state in which the power transmission device 31 and the vehicle 20 are located at a position where electric power is favorably transmitted and received between the power transmission device 31 and the vehicle 20. Thus, electric power having a specific pattern for pairing is also favorably transmitted and received between the power transmission device 31 and the vehicle 20, and pairing is reliably performed.

(5) The end of the alignment is detected by the power supply processor 11 based on electrical changes in the impedance, the current, the voltage, the phase, and the cycle of the power transmission device 31. Since the end of the alignment is detected with a small number of components, it is expected that the structure will be simplified and the costs will be reduced. The power supply processor 11 is shifted to, for example, a subsequently performed pairing process in a short time.

(6) Since the electric powers having specific patterns include patterns for pairing that are different from each other, even if the electric powers are output from the power transmission devices 31 at a timing at which the output periods of the electric powers having specific patterns at least partially overlap, it is possible to pair each vehicle 20 with the associated power transmission device 31. That is, the time required for paring is reduced since pairing is performed in a suitable manner even if electric powers having specific patterns are substantially simultaneously output from the power transmission devices 31.

(7) It is relatively easy to output an electric power pulse from the power transmission device 31 by outputting/stopping the electric power. Thus, such a pairing is easily performed with the electric power with pulse variation.

(8) The information about the specific pattern is a pulse width. Since the specific pattern can be generated simply by changing the timing at which the electric power is output/stopped, the electric power with different specific pattern is easily produced.

(9) The specific pattern is formed of only one pulse. Thus, the time required for detecting the specific pattern is reduced, and the time required for pairing is also reduced. One pulse is also easily output from the power transmission device 31.

(10) The power supply controller 10 obtains information about the specific pattern from the pattern of the received electric power and transmits the information to the power supply processor 11. Thus, the power supply controller 10 can associate or pair the vehicle 20 with the power transmission device 31 that has output the specific pattern. Thus, pairing of the power transmission device 31 with the vehicle 20 in the non-contact charging is more favorably performed.

Second Embodiment

A non-contact charging system according to a second embodiment will now be described with reference to FIGS. 11 and 12. In the present embodiment, part of the procedures for the parking alignment and the pairing process differs from the procedures for the parking alignment and the pairing process according to the first embodiment. The differences are mainly discussed below. Since the configurations of the power supplying apparatus and the vehicle 20 are the same, the description of the same configurations will be omitted for convenience of description. That is, in the first embodiment, the power supply controller 10 determines the completion of alignment for the first vehicle 201 and the second vehicle 202 as represented by steps S202, S204 of FIG. 8 and determines the start of the pairing process as represented by step S300 of FIG. 9. In the second embodiment, however, the first vehicle 201 and the second vehicle 202 request the power supply controller 10 for the completion of alignment as represented by steps S542, S552 of FIG. 11, and further request the power supply controller 10 for the starting of the pairing process as represented by steps S640, S650 of FIG. 12.

Figure 11:
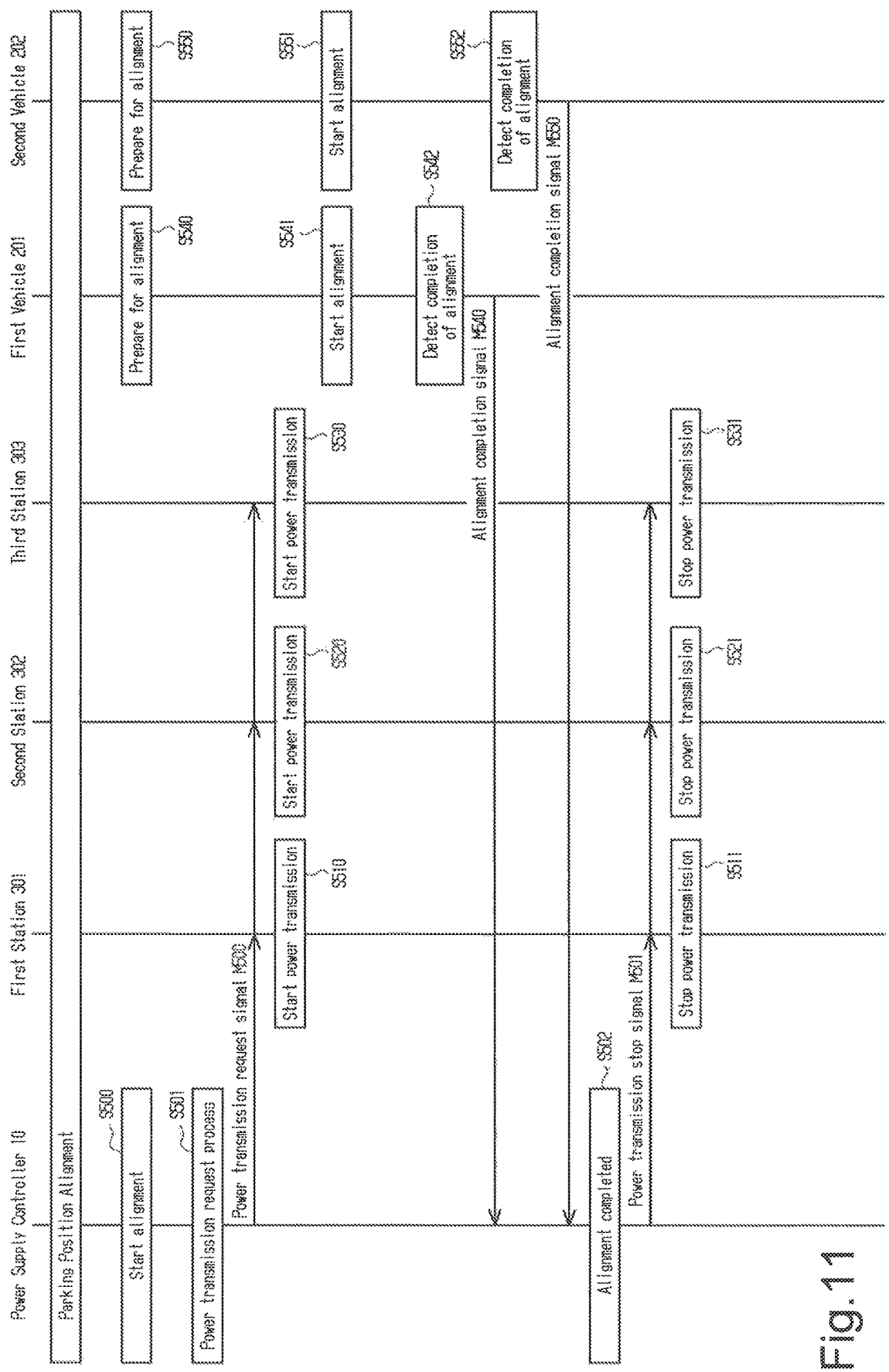
FIG. 11 is a sequence chart, showing a routine for aligning vehicles in a non-contact charging system according to a second embodiment.

As shown in FIG. 11, when the power supply controller 10 detects that the first vehicle 201 and the second vehicle 202 have additionally entered the charging area, the power supply controller 10 starts a process for parking alignment (step S500 of FIG. 11). The first vehicle 201 and the second vehicle 202 start preparing for alignment after responding to the response request signal (steps S540, S550 of FIG. 11).

When the process for parking alignment is started, the power supply controller 10 performs a process for requesting power transmission to the first to third stations 301 to 303 (step S501 of FIG. 11). The power supply controller 10 outputs a power transmission request signal M500 for electric power having the alignment pattern to the first to third stations 301 to 303. In response to the power transmission request signal M500, transmission of electric power having the alignment pattern from the first to third stations 301 to 303 is started (steps S510, S520, S530 of FIG. 11).

When transmission of electric power having the alignment pattern from the first to third stations 301 to 303 is started, the first and second vehicles 201, 202, which receive the electric power, start aligning such that the received electric power becomes greater than or equal to the chargeable strength V1 (steps S541, S551 of FIG. 11). When the received electric power becomes greater than or equal to the chargeable strength V1, the first and second vehicles 201, 202 detect the completion of alignment (steps S542, S552 of FIG. 11). In response to detection of the completion of the alignment, the first and second vehicles 201, 202 notify drivers in the vehicles of the completion of the alignment.

In the present embodiment, in response to detection of the completion of the alignment, the first vehicle 201 transmits an alignment completion signal M540 and the second vehicle 202 transmits an alignment completion signal M550 to the power supply controller 10. When the power supply controller 10 receives the alignment completion signals M540, M550, the power supply controller 10 detects that the first and second vehicles 201, 202 are aligned in any of the first to third stations 301 to 303. The power supply controller 10 determines that alignments of the additionally entered two vehicles 20 have been completed and outputs a power transmission stop signal M501 to all the stations to stop transmitting electric power having the alignment pattern (step S502 of FIG. 11). Thus, the first to third stations 301 to 303, which have received the power transmission stop signal M501, stop transmitting electric power having the alignment pattern (step S531 of FIG. 11). Consequently, the power supply controller 10 ends the alignment of the two vehicles 20.

Figure 12:
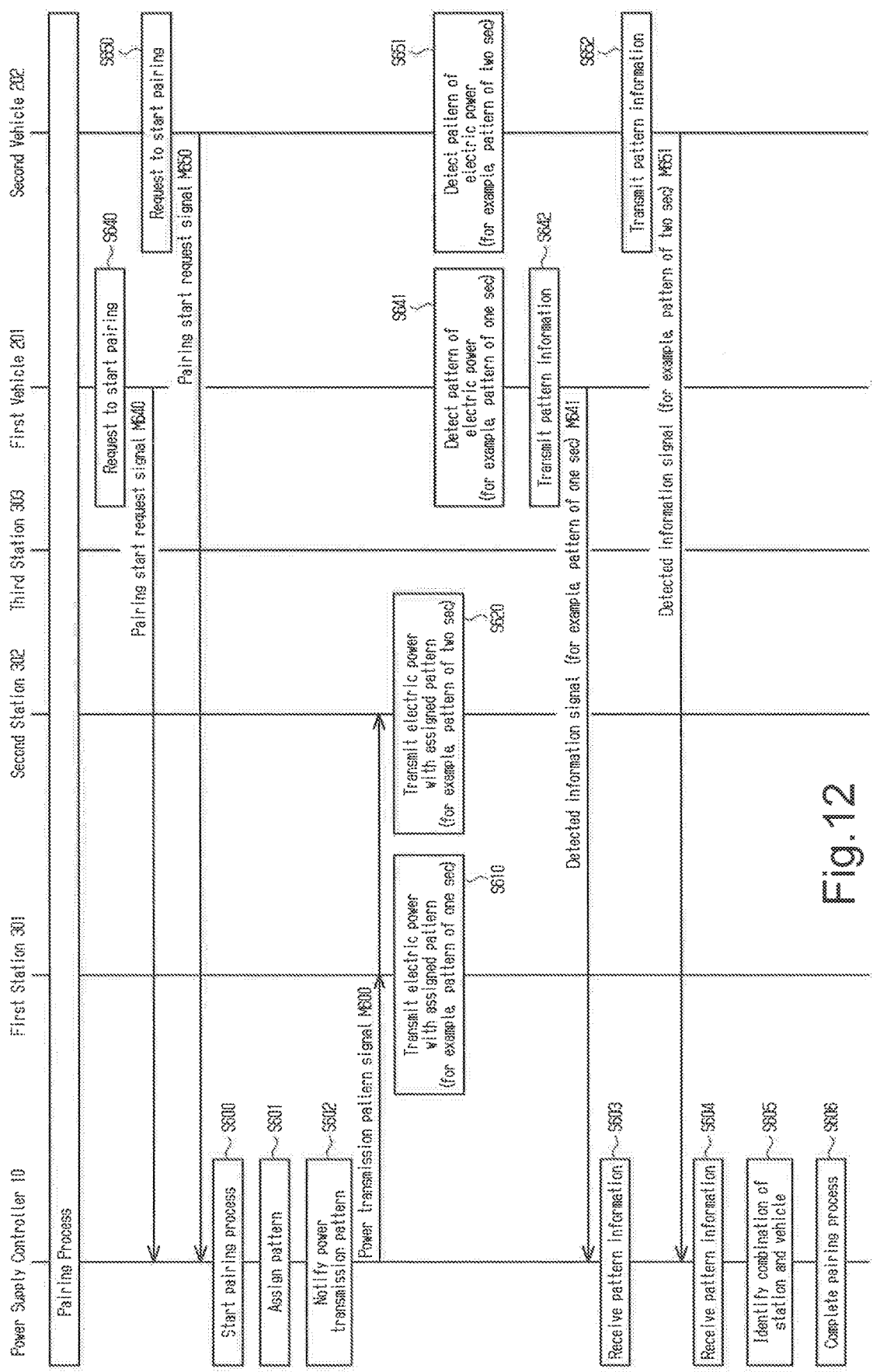
FIG. 12 is a sequence chart showing a routine for pairing the vehicles with the charging areas continued from FIG. 11.

As shown in FIG. 12, when the process for parking alignment ends, the first and second vehicles 201, 202 respectively transmit pairing start request signals M640, M650 for starting pairing to the power supply controller 10 (steps S640, S650 of FIG. 12).

Upon receipt of the pairing start request signals M640, M650 from the additional two vehicles 20, the power supply controller 10 starts the pairing process (step S600 of FIG. 12). At this time, the power supply controller 10 identifies at least the third station 303, in which the vehicle 20 is not located, and excludes the identified third station 303 from the pairing target. The power supply controller 10 assigns the specific patterns to be granted to the electric powers for pairing to the first and second stations 301, 302 (step S601 of FIG. 12). For example, the power supply controller 10 assigns a pattern having a step waveform with a length of "one second" to the first station 301 and a pattern having a step waveform with a length of "two seconds" to the second station 302. A specific pattern to be granted to the electric power for pairing is not assigned to the third station 303.

When the specific patterns to be assigned to the first and second stations 301, 302 are determined, the power supply controller 10 outputs a power transmission pattern signal M600 to notify the specific pattern for pairing to the first and second stations 301, 302 (step S602 of FIG. 12). The first and second stations 301, 302, which have received the power transmission pattern signal M600, start power transmission in accordance with the assigned power transmission pattern. For example, the first station 301, to which the pattern having a step waveform with a length of "one second" is assigned, transmits (outputs) the electric power having a step waveform with a length of "one second" from the power transmitter coil L1 (step S610 of FIG. 12). For example, the second station 302, to which the pattern having a step waveform with a length of "two seconds" is assigned, transmits (outputs) the electric power having a step waveform with a length of "two seconds" from the power transmitter coil L1 (step S620 of FIG. 12).

The first vehicle 201, which has requested the pairing process, detects information about the pattern of the electric power received by the power receiver coil L2. For example, the first vehicle 201 detects that the supply time was "one second" as the pattern of the received electric power (step S641 of FIG. 12) and transmits a pattern information signal M641 including the fact that the supply time of the electric power was "one second" to the power supply controller 10 via the wireless communication device 27 (step S642 of FIG. 12). The transmitted pattern information signal M641 is received by the power supply controller 10 (step S603 of FIG. 12). Similarly, for example, the second vehicle 202 detects that the supply time was "two seconds" as the pattern of the received electric power (step S651 of FIG. 12) and transmits at pattern information signal M651 including the fact that the supply time of electric power was "two seconds" to the power supply controller 10 via the wireless communication device 27 (step S652 of FIG. 12). The transmitted pattern information signal M651 is received by the power supply controller 10 (step S604 of FIG. 12).

The power supply controller 10, which has received the two pattern information signals M641, M651, identifies the combination of the stations 30 and the vehicles 20 (step S605 of FIG. 12). For example, since the specific pattern assigned to the first station 301 is a step waveform of "one second" and the pattern information signal M641 from the first vehicle 201 indicates that the supply time was "one second," the power supply controller 10 determines that the first vehicle 201 has received the electric power for pairing from the first station 301. Thus, the power supply controller 10 pairs the first vehicle 201 with the first station 301. For example, since the specific pattern assigned to the second station 302 is a step waveform of "two seconds" and the pattern information signal M651 from the second vehicle 202 indicates that the supply time was "two seconds," the power supply controller 10 determines that the second vehicle 202 has received the electric power for pairing from the second station 302. Thus, the power supply controller 10 pairs the second vehicle 202 with the second station 302.

Consequently, the power supply controller 10 ends pairing of the two vehicles 20 that have additionally entered the charging areas BS (step S606 of FIG. 12).

As described above, the non-contact charging system according to the present embodiment has the following advantages in addition to the advantages (1) to (3) and (6) to (10) of the above-described first embodiment.

(11) Since the power supply controller 10 is notified of the completion of alignment from the vehicle 20 that the power supply controller 10 has aligned, the power supply controller 10 performs a pairing process after alignment of the vehicle 20 is completed. Thus, pairing is more favorably performed in a state in which the power transmission device 31 and the vehicle 20 are aligned in a suitable manner.

Third Embodiment

A non-contact charging system according to a third embodiment will now be described with reference to FIGS. 13 and 14. In the present embodiment, part of the procedures for the parking alignment and the pairing process differs from the procedures for the parking alignment and the pairing process according to the first embodiment. The differences are mainly discussed below. Since the configurations of the power supplying apparatus and the vehicle 20 are the same, the description of the same configurations will be omitted for convenience of description. As shown in FIG. 11, in the second embodiment, the first vehicle 201 and the second vehicle 202 transmit the alignment completion signals M540, M550 to the power supply controller 10. However, in the third embodiment shown in FIG. 13, the first vehicle 201 and the second vehicle 202 do not transmit the alignment completion signals M540, M550 to the power supply controller 10. The first vehicle 201 and the second vehicle 202 transmit pairing start request signals M741, M751 to the power supply controller 10 after detecting completion of the alignment at steps S742, S752.

Figure 13:
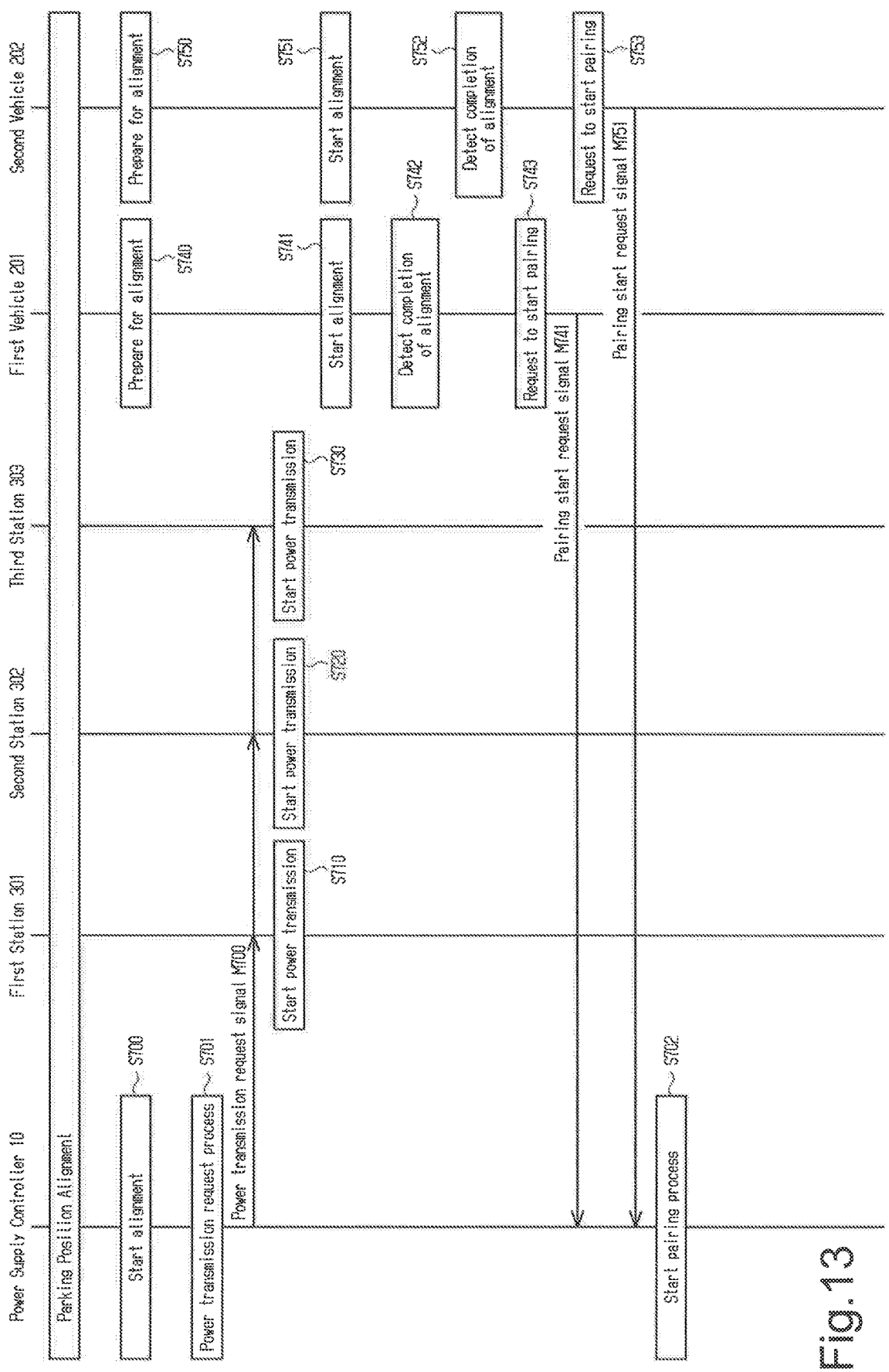
FIG. 13 is a sequence chart showing a routine for aligning vehicles in a non-contact charging system according to a third embodiment.

As shown in FIG. 13, when the power supply controller 10 detects that the first vehicle 201 and the second vehicle 202 nave additionally entered the charging area, the power supply controller 10 starts a process for parking alignment (step S700 of FIG. 13). The first vehicle 201 and the second vehicle 202 start preparing for the alignment after responding to the response request signal (steps S740, S759 of FIG. 13).

When the process for the parking alignment is started, the first to third stations 301 to 303 start transmitting electric power having the alignment pattern (steps S710, S720, S730 of FIG. 13) in response to a power transmission request signal M700 output by the power transmission request process from the power supply controller 10 (step S701 of FIG. 13).

When the transmission of electric power having the alignment pattern from the first to third stations 301 to 303 is started, the first and second vehicles 201, 202, which receive the electric power, start alignment such that the strength of the received electric power is greater than or equal to the chargeable strength V1 (steps S741, S751 of FIG. 13). When the strength of the received electric power is greater than or equal to the chargeable strength V1, the first and second vehicles 201, 202 detect the completion of the alignment (steps S742, S752 of FIG. 13). In response to the detection of the completion of the alignment, the first and second vehicles 201, 202 transmit the pairing start request signals M741, M751 for starting pairing to the power supply-controller 10 (steps S743, S753 of FIG. 13).

When the power supply controller 10 receives the pairing start request signals M640, M650 from the additional two vehicles 20, the power supply controller 10 starts the pairing process (step S702 of FIG. 13). At this time, the power supply controller 10 identifies at least the third station 303, in which the vehicle 20 is not located, and excludes the identified third station 303 from the pairing target.

Figure 14:
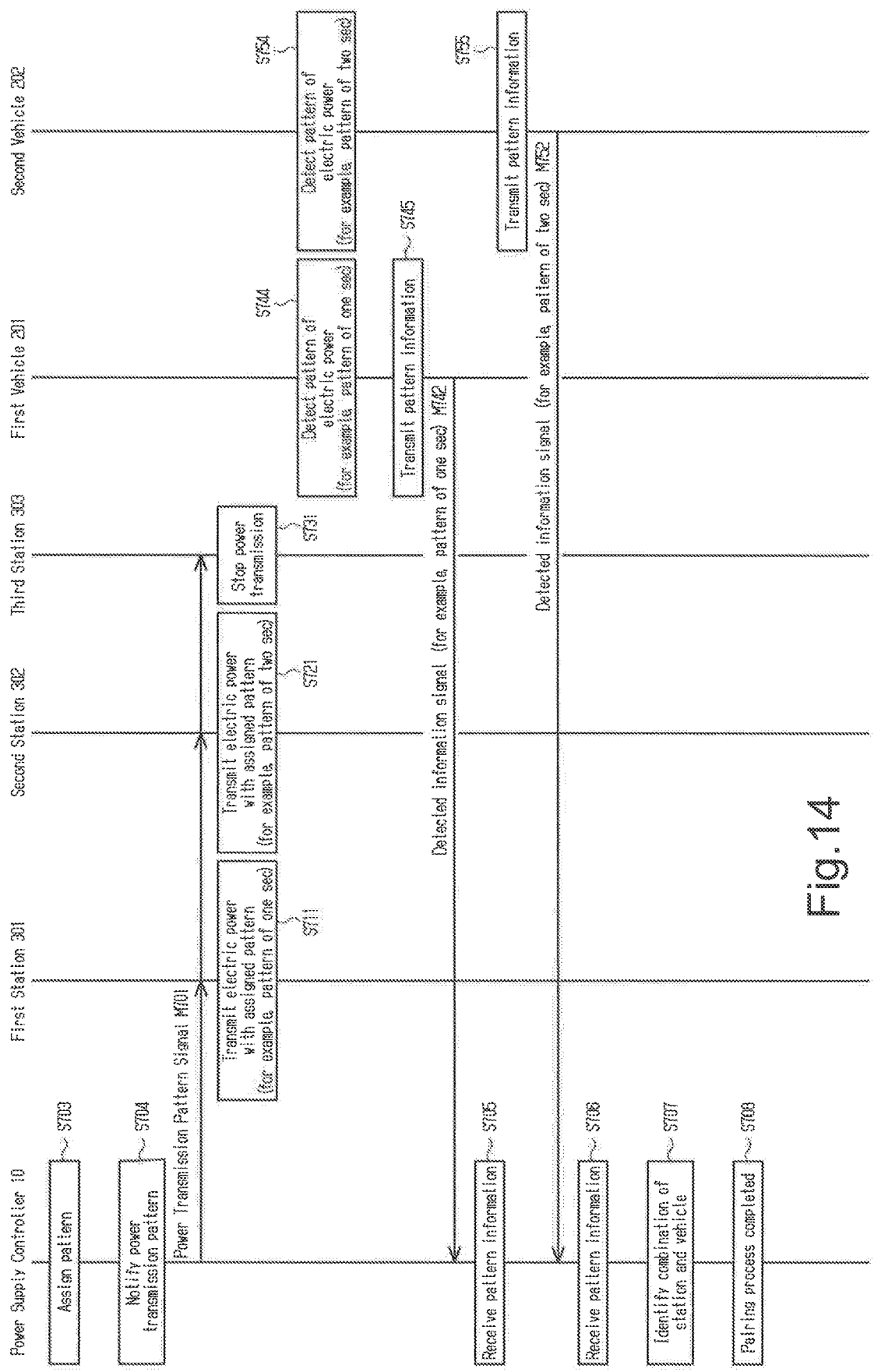
FIG. 14 is a sequence chart showing a routine for pairing the vehicles with the charging areas continued from FIG. 13.

As shown in FIG. 14, when the pairing process is started, the power supply controller 10 assigns the specific patterns to be granted to electric power for pairing to the first and second stations 301, 302 (step S601 of FIG. 12). For example, the power supply controller 10 assigns a pattern having a step waveform with a length of "one second" to the first station 301 and a pattern having a step waveform with a length of "two seconds" to the second station 302. A specific pattern to be granted to the electric power for pairing is not assigned to the third station 303.

When the specific patterns to be assigned to the first and second stations 301, 302 are determined, the power supply controller 10 outputs a power transmission pattern signal M701 to notify the specific pattern for pairing to the first and second stations 301, 302 (step S704 of FIG. 14). The first and second stations 301, 302, which have received the power transmission pattern signal M701, change the pattern of output electric power from the previously set alignment pattern to the assigned power transmission pattern to change the output electric power from the alignment pattern to the assigned specific pattern for pairing. The first and second stations 301, 302 change the electric power to be transmitted from the alignment pattern to the specific pattern for pairing and transmit the electric power. For example, the first station 301, which has been assigned with a pattern having a step waveform with a length of "one second," stops electric power having a constant output strength and subsequently transmits (outputs) electric power having a step waveform with a length of "one second" from the power transmitter coil L1 (step S711 of FIG. 14). For example, the second station 302, which has been assigned with a pattern having a step waveform with a length of "two seconds," stops transmitting electric power having a constant output strength and subsequently transmits (outputs) electric power having a step waveform with a length of "two seconds" from the power transmitter coil L1 (step S721 of FIG. 14). The third station 303 to which a specific pattern for pairing is not assigned instead of the alignment pattern stops transmitting (outputting) electric power from the power transmitter coil L1 (step S731 of FIG. 14).

The first vehicle 201, which has requested a pairing process, detects that the pattern of the electric power received by the power receiver coil L2 had a supply time of "one second" and transmits a pattern information signal M742 including that the supply time of the electric power was "one second" to the power supply controller 10 via the wireless communication device 27 (steps S744, S745 of FIG. 14). Similarly, the second vehicle 202 detects that the pattern of the electric power received by the power receiver coil L2 had a supply time of "two seconds" and transmits a pattern information signal M752 including that the supply time of the electric power was "two seconds" to the power supply controller 10 via the wireless communication device 27 (steps S754, S755 of FIG. 14).

The power supply controller 10, which has received two pattern information signals M641, M651, identifies the combination of the stations 30 and the vehicles 20 (steps S705, S706, S707 of FIG. 14). For example, like the above-described embodiments, the power supply controller 10 pairs the first vehicle 201 with the first station 301 and pairs the second vehicle 202 with the second station 302.

Thus, the power supply controller 10 ends pairing the two vehicles 20 that have additionally entered the charging areas BS (step S708 of FIG. 14).

As described above, the non-contact charging system according to the present embodiment has the following advantages in addition to the advantages (1) to (3) and (6) to (10) of the above-described first embodiment.

(12) The pattern of the electric power transmitted from the power transmission device 31 can also be directly switched from the alignment pattern to the pairing pattern. This further simplifies the control for transmitting electric power from the power transmission device 31 in the parking alignment and the pairing process.

Other Embodiments

The above described embodiments may be modified as follows.

Each of the above-described embodiments illustrates a case in which, when pairing ends, a process for establishing communication is started in response to the connection request signals M440, M450 from the first and second vehicles 201, 202 shown in FIG. 10. However, the power supply controller 10 may start a process for establishing the communication in different manners.

Figure 15:
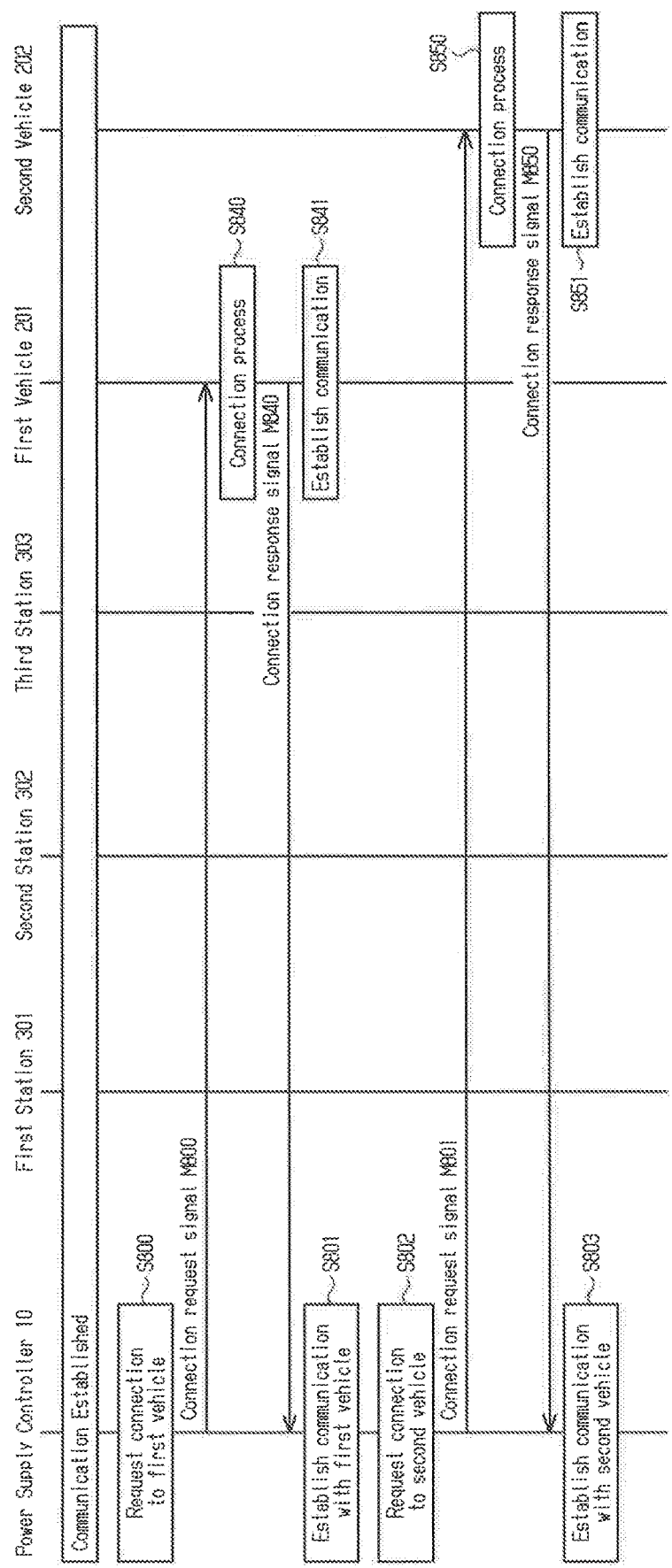
FIG. 15 is a sequence chart showing a routine for establishing communication between vehicles and charging areas in a non-contact charging system, according to a modification.

For example, as shown in FIG. 15, when pairing ends, the power supply controller 10 establishes communication with the vehicles 20. The power supply controller 10 transmits a connection request signal M800 to the first vehicle 201 via the wireless communication device 12 to establish communication with the first vehicle 201 corresponding to the first station 301 (step S800 of FIG. 15). The first vehicle 201, which has received the connection request signal M800, performs a connection process (step S840 of FIG. 15) and transmits a connection response signal M840 via the wireless communication device 27 when the connection process ends. Thus, the first vehicle 201 establishes communication with the power supply controller 10 (step S841 of FIG. 15). The power supply controller 10, which has received the connection response signal M840, establishes communication between the first station 301 and the paired first vehicle 201 (step S801 of FIG. 15). For example, the power supply controller 10 transmits a connection request signal M801 via the wireless communication device 12 to the second vehicle 202 to establish communication with the second vehicle 202 corresponding to the second station 302 (step S802 of FIG. 15). The second vehicle 202, which has received the connection request signal M801, performs a connection process (step S850 of FIG. 15) and transmits a connection response signal M850 via the wireless communication device 27 when the connection process ends. Thus, the second vehicle 202 establishes communication with the power supply controller 10 (step S851 of FIG. 15). The power supply controller 10, which has received the connection response signal M850, establishes communication between the second station 302 and the paired second vehicle 202 (step S803 of FIG. 15).

This increases the flexibility in design of the non-contact charging system.

In each of the above-described embodiments, the charging areas BS may be assigned with specific patterns for pairing in the order of vacancy. However, the specific patterns for pairing may be assigned in the order of the priority of the charging areas.

For example, as shown in FIG. 16, using the descending order of usage frequency as the priority, a pattern with a short length of step is assigned in the descending order of the priority. When none of the charging areas BS1 to BS5 is in use, a short pattern is assigned in the descending order of usage rate of the charging areas (pattern 11). When the second, third, and fifth charging areas BS2, BS3, BS5 are not in use, a short pattern is assigned in the descending order of usage rate, that is, in the order of the fifth charging area BS5, the second charging area BS2, and the third charging area BS3 (pattern 12). With this configuration, the time required for pairing is expected to be reduced since there is a high possibility that the vehicle is located at the power transmission device 31 to which a short specific pattern is assigned even in a case in which the pairing process is executed for all the stations not used for charging.

In each of the above-described embodiments, the driver moves the entire vehicle 20 with respect to the power transmitter coil L1 to move the power receiver coil L2 to a position facing the power transmitter coil L1. However, the power receiver coil L2 may be separately moved with a vehicle-mounted actuator with respect to the vehicle body in order to move the power receiver coil L2 to a position facing the power transmitter coil L1. Such movement may be controlled by a charging area guiding unit. Alternatively, the power transmitter coil L1 may be moved with an actuator with respect to the ground surface in order to move the power transmitter coil L1 to a position facing the power receiver coil L2.

The above-described embodiments illustrate a case in which the charge control unit 22, the communication control unit 25, the memory 26, the wireless communication device 27, and the charging area guiding unit 28 are mounted on the vehicle 20. However, some of the functions of the charge control unit, the communication control unit, the memory, the wireless communication device, and the charging area guiding unit may be provided in an information processing device outside the vehicle or a portable information processing device. The information processing device outside the vehicle includes an information processing center, and the portable information processing device includes a mobile phone and a smartphone. In a case with the information processing device outside the vehicle, information may be transferred using a wireless communication circuit. The portable information processing device may be connected to an on-board network or connected through a snort distance communication, or information may be transferred via a wireless communication circuit. This improves the flexibility in design of the non-contact charging system.

Each of the above-described embodiments illustrates a case in which the pairing processor 113 assigns specific patterns for pairing to the vacant charging areas BS. However, the pairing processor may previously set patterns to be assigned to the charging areas. For example, it may be previously set to assign the first pattern to the first charging area, the second pattern to the second charging area, the third pattern to the third charging area, the fourth pattern to the fourth charging area, and the nth pattern to the nth charging area. It is unnecessary to change the pattern in accordance with the specification. Thus, the pairing process is easily performed.

Each of the above-described embodiments illustrates a case in which the power supply controller 10 does not assign a specific pattern for a pairing process to the station 30 in which the vehicle 20 is not detected. However, the power supply controller may assign specific patterns for a pairing process to all the stations not used for charging. In this case also, the vehicles and the stations are paired in a suitable manner.

Each of the above-described embodiments illustrates a case in which a specific pattern includes one step waveform. However, the pattern with a step waveform may be configured by a pattern with multiple step waveforms. For example, by transmitting a pattern with the same length of step waveform a number of times, the accuracy for the vehicle 20 to detect the information about the pattern of the electric power is increased. This improves the accuracy of the non-contact charging system.

In this case, time intervals of the pattern with multiple step waveforms may be the same length as the pattern of the step waveform. Thus, the vehicle can obtain information about the pattern of the electric power from the received electric power in either a case in which the electric power is supplied or a case in which the electric power is stopped. Thus, the convenience of such a non-contact charging system is improved.

The above-described embodiments illustrate a case in which the pattern of the step waveform is detected depending on the state of the electric power when being supplied. However, the pattern of the step waveform may be detected from a state in which the supply of electric power is stopped. For example, the pattern on the step may be generated by stopping the electric power during power transmission. This increases the flexibility in design of the non-contact charging system.

Each of the above-described embodiments illustrates a case in which the specific pattern for pairing is a pattern with a step waveform. However, the shape of the waveform may be any shape other than a triangle and an arc step if the pattern can be detected as the specific pattern. This increases the flexibility in design of the non-contact charging system.

Each of the above-described embodiments illustrates a case in which transmission of electric power having an alignment pattern is stopped in each of the stations 30 that have completed alignment. However, transmission of electric power having an alignment pattern from all the stations 30 that are the targets of alignment may be stopped when alignments are completed by the number of times equal to the number of detected additional vehicles 20. In this case, since transmission of the electric power having an alignment pattern can be started and stopped all together, the transmission of the electric power having an alignment pattern is easily started and stopped. This increases the flexibility in design of the non-contact charging system.

Each of the above-described embodiments illustrates a case in which transmission of electric power having an alignment pattern is stopped in response to the completion of alignment of the vehicle 20. However, the electric power having an alignment pattern may be transmitted until the pairing process is started. This increases the flexibility in design of the non-contact charging system.

Each of the above-described embodiments illustrates a case in which a process for establishing communication is performed subsequent to the pairing process. However, the process performed subsequent to the pairing process is not limited to a process for establishing communication. That is, any process may be performed after the pairing process, and communication may be established using a communication system different from the communication system of the present embodiment. This increases the possibility of application of the non-contact charging system including the pairing process.

Each of the above-described embodiments illustrates a case in which the pairing process is performed subsequent to the process for parking alignment. However, the process for parking alignment may be omitted, and the pairing process may be performed. For example, if the vehicle 20 can be parked such that the power transmitter coil L1 faces the power receiver coil L2 by using a marking, the pairing process can be performed even if the parking alignment process is omitted. Thus, the application range of the non-contact charging system is increased.

Each of the above-described embodiments illustrates a case in which the power supply controller detects the vehicle 20 when the vehicle 20 responds to the response request signal, which has the communication range including the charging areas BS and the proximity. However, the power supply controller may detect a vehicle in the charging areas and the proximity by various vehicle sensors, such as an optical sensor, a sonic sensor, and a magnetism sensor or by recognizing an image of a camera. This increases the application range of the non-contact charging system.

Each of the above-described embodiments illustrates a case in which the power transmitter coil L1 is embedded in the ground surface. However, the power transmitter coil may be provided at a position corresponding to the front, the rear, the left side, or the right side of the vehicle or a position above the vehicle. In this case, since the vehicle does not get on the power transmitter coil L1, the power transmitter coil may nave a simple structure, or the power transmitter coil may be easily installed. If the position of the power transmitter coil, is at the front, the rear, the left, or the right, the vehicle can be brought close to the power transmitter coil while looking at the position of the power transmitter coil. In this case, the power receiver coil of the vehicle may be provided on the front, the rear, the side surfaces, or the top surface of the vehicle corresponding to the power transmitter coil. This increases the flexibility in design and the application range of the non-contact charging system.

Each of the above-described embodiments illustrates a case in which the strength of the electric power is, for example, the degree of the voltage of the electric power. However, the power transmission device may include a function capable of controlling the voltage, the current, the cycle, or the phase of the pulse. The difference in the voltage, the current, the cycle, or the phase may be used as the information about the property of the pulse obtained from the electric power. This increases the flexibility in design of the non-contact charging system.

Each of the above-described embodiments illustrates a case in which the power supplying apparatus and the vehicle 20 are connected by wireless communication between the wireless communication devices 12, 27 to be able to transfer information. However, if the power supplying apparatus and the vehicle are connected to be able to transfer information, the power supplying apparatus and the vehicle may, for example, include wired connection, nave connection including a public circuit, or have connection including a network. With any of the connections, the non-contact charging system reliably pairs the power supplying apparatus, which supplies electric power in a noncontact manner, with the vehicle. This increases the flexibility in design of a vehicle using the non-contact charging system.

In each of the above-described embodiments, electric power is transmitted from the station 30 to the vehicle 20 by electromagnetic induction or electromagnetic field resonance between the power transmitter coil L1 and the power receiver coil L2. However, electric power may be transmitted from the station to the vehicle by, for example, a microwave transmission system or an evanescent wave transmission system. The present disclosure can be applied if electric power is transmitted from the station 30 to the vehicle in a noncontact manner.

Each of the above-described embodiments illustrates a case in which the device to be charged is the vehicle 20 such as a hybrid car or an electric car. However, the device to be charged may be any device that includes a storage battery and requires supply of electric power for charging. For example, the device to be charged may be boats, ships, trains, robots, electric appliances, and portable devices such as mobile phones. That is, the present disclosure can be applied to any device if the device to be charged is capable of being charged by non-contact charging.

DESCRIPTION OF THE REFERENCE NUMERALS

10 . . . power supply controller, 11 . . . power supply processor, 111 . . . vehicle detector, 112 . . . alignment assisting unit, 113 . . . pairing processor, 114 . . . power transmission control unit, 12 . . . wireless communication device, 13 . . . communication control unit, 20 . . . vehicle, 201 . . . first vehicle, 202 . . . second vehicle, 22 . . . charge control unit, 221 . . . information detector, 23 . . . rectifier, 24 . . . storage battery, 25 . . . communication control unit, 26 . . . memory, 27 . . . wireless communication device, 28 . . . charging area guiding unit, 30 . . . station, 301 to 305 . . . first to fifth stations, 30n . . . nth station, 31 . . . power transmission device, 32 . . . electric power transmitter, 321 . . . electric power control unit, BS . . . charging area, CA . . . charging position, L1 . . . power transmitter coil, L2 . . . power receiver coil, BS1 to BSn . . . first to nth charging areas.

The invention claimed is:

1. A non-contact charging system comprising a plurality of power transmitters, a communication device, and a power supply processor,
wherein the power transmitters are configured to supply electric power to a device to be charged in a noncontact manner,
the communication device is configured to be capable of obtaining information transmitted from the device to be charged,
the power supply processor is configured to control electric power transmitted by the power transmitters for each power transmitter,
the existence of the device to be charged is detected,
the power supply processor is configured to set a specific width as a pulse width of pulsed electric power transmitted from each power transmitter in response to detection of the existence of the device to be charged, and the specific pulse width varies from one power transmitter to another,
the communication device is configured to receive information about the specific pulse width transmitted from the device to be charged, and the device to be charged is configured to obtain the specific pulse width from the received electric power,
each power transmitter and the device to be charged corresponding to the power transmitter configure a combination,
the power supply processor is configured to identify the combination of each power transmitter and the device to be charged corresponding to the power transmitter based on correspondence between the information about the specific pulse width that has been set and the information about the specific pulse width that has been received,
the power supply processor is configured to supply the pulsed electric power with the specific pulse width to perform a pairing process to identify the combination between the power transmitter and the device to be charged, the power supply processor is configured to supply the power to the device to be charged after the pairing process from the corresponding power transmitter to charge the device to be charged,
a length of the specific pulse width is one second or more to identify the combination of each power transmitter and the device to be charged,
the power supply processor is configured to convert electric power input from a commercial power source to supply from each power transmitter, and to supply electric power that changes in pulses to the power transmitter by switching between supplying and stopping of an AC power,
the specific pulse width of the pulsed electric power is set to the time length at least equal to or greater than twice times the period of the electric power supplied after the pairing process to charge the device to be charged,
the device to be charged is provided on a vehicle, and the vehicle includes a power receiver, and
the pulsed electric power is configured by a plurality of individual AC pulses transmitted from the power transmitter.

2. The non-contact charging system according to claim 1, wherein
the power supply processor is configured to set, to the specific pulse width, the pulse width of electric power to be transmitted from each power transmitter, the specific pulse width varies from one power transmitter to another,
the power supply processor is further configured to set, to an alignment pattern, the pattern of the electric power to be transmitted from each power transmitter, and
the alignment pattern is used to align the power receiver of the vehicle with respect to each power transmitter.

3. The non-contact charging system according to claim 2, wherein the alignment pattern is a pattern different from the pulse having the specific pulse width.

4. The non-contact charging system according to claim 2, wherein the power supply processor is configured to identify the combination of each power transmitter and the device to be charged when alignment of the power receiver of the vehicle with respect to the power transmitter ends.

5. The non-contact charging system according to claim 4, wherein
an electrical change occurs in each power transmitter, and
the power supply processor is configured to detect an end of the alignment based on the electrical change that occurs in each power transmitter.

6. The non-contact charging system according to claim 2, wherein the alignment pattern is electric power that maintains a constant strength.

7. The non-contact charging system according to claim 1, wherein
each power transmitter is configured to transmit electric power having the set specific pulse width during an output period, and
the power supply processor is configured to transmit electric power having the set specific pulse width from each of the power transmitters such that there is a timing at which the output periods from the power transmitters at least partially overlap one another.

8. The non-contact charging system according to claim 1, wherein
the specific pulse width is expressed by a pulse generated by a pulse change of electric power, and
the information about the specific pulse width includes information about a property of the pulse detected from the specific pulse width.

9. The non-contact charging system according to claim 8, wherein the information about the property of the pulse of the electric power is expressed by a pulse width of the pulse.

10. The non-contact charging system according to claim 1, wherein the specific pulse width is a pulse width configured by only one pulse.

11. A non-contact charging system comprising a power receiver, wherein
the power receiver is configured to receive electric power transmitted from a power transmitter in a noncontact manner,
the power receiver is further configured to supply the received electric power to a device to be charged,
the power transmitter is configured to transmit electric power in accordance with a specific pulse width set by a power supply processor,
the device to be charged is configured to receive electric power from the power receiver,
the device to be charged includes:
a pattern information processor configured to obtain information about the specific pulse width from electric power received from the power receiver; and
a communication device configured to transmit the obtained information about the specific pulse width to the power supply processor, the power supply processor is configured to supply the
pulsed electric power with the specific pulse width to
perform a pairing process to identify the combination
between the power transmitter and the device to be
charged, the power supply processor is configured to
supply the power to the device to be charged after the
pairing process from the corresponding power transmitter to charge the device to be charged, wherein a length of the specific pulse width is one second or more, wherein the power supply processor is configured to convert electric power input from a commercial power source to supply from the power transmitter, and to supply electric power that changes in pulses to the power transmitter by switching between supplying and stopping of an AC power, wherein the specific pulse width of the pulsed electric power is set to the time length at least equal to or greater than twice times the period of the electric power supplied after the pairing process to charge the device to be charged, wherein the device to be charged is provided on a vehicle, and the vehicle includes a power receiver, and wherein the pulsed electric power is configured by a plurality of individual AC pulses transmitted from the power transmitter.

12. A non-contact charging system comprising a device to be charged, a power supply processor, and a plurality of power transmitters, wherein the device to be charged includes a power receiver configured to receive electric power for charging a storage battery and a communication device configured to be capable of communicating with an external device, the power supply processor includes a communication device configured to be capable of intercommunicating with the device to be charged, each power transmitter is configured to transmit electric power to the device to be charged in a noncontact manner, each power transmitter is configured such that the power supply processor controls electric power transmitted from the power transmitter, the existence of the device to be charged is detected, the power supply processor is configured to transmit pulsed electric power having a specific pulse width from each power transmitter in response to detection of the existence of the device to be charged, and the specific pulse width differs from one power transmitter to another, the device to be charged is configured to receive electric power from the associated power transmitter via the power receiver, the device to be charged is configured to transmit information about the specific pulse width of the obtained electric power to the power supply processor via the communication device, the power supply processor is configured to identify a combination of each power transmitter and the device to be charged, the power supply processor is configured to identify the combination of each power transmitter and the device to be charged based on correspondence between the information about the specific pulse width that has been set and the information about the specific pulse width that has been transmitted, the power supply processor is configured to supply the pulsed electric power with the specific pulse width to perform a pairing process to identify the combination between the power transmitter and the device to be charged, the power supply processor is configured to supply the power to the device to be charged after the pairing process from the corresponding power transmitter to charge the device to be charged, a length of the specific pulse width is one second or more, the power supply processor is configured to convert electric power input from a commercial power source to supply from each power transmitter, and to supply electric power that changes in pulses to each power transmitter by switching between supplying and stopping of an AC power, the specific pulse width of the pulsed electric power is set to the time length at least equal to or greater than twice times the period of the electric power supplied after the pairing process to charge the device to be charged, the device to be charged is provided on a vehicle, and the vehicle includes a power receiver, and the pulsed electric power is configured by a plurality of individual AC pulses transmitted from the power transmitter.

13. A pairing method used in a non-contact charging system, the non-contact charging system comprising:

a plurality of power transmitters configured to supply electric power to a device to be charged in a noncontact manner;

a communication device configured to be capable of obtaining information transmitted from the device to be charged; and a power supply processor configured to control electric power transmitted from the power transmitters for each power transmitter, wherein the existence of the device to be charged is detected, the pairing method comprising:

setting a pulse width of pulsed electric power to be transmitted from each power transmitter to a specific pulse width by the power supply processor in response to detection of the existence of the device to be charged, wherein the specific pulse width differs from one power transmitter to another;

receiving information about the specific pulse width transmitted from the device to be charged by the communication device, wherein the device to be charged obtains the information about the specific pulse width from the received electric power; and determining a combination of each power transmitter and the device to be charged corresponding to the power transmitter by the power supply processor, wherein the power supply processor identifies the combination of each power transmitter and the device to be charged based on correspondence between the information about the specific pulse width that has been set and the information about the specific pulse width that has been received, wherein a length of the specific pulse width is one second or more;

converting electric power input from a commercial power source to supply from each power transmitter by the power supply processor, supplying electric power that changes in pulses to each power transmitter by switching between supplying and stopping of an AC power by the power supply processor; and setting the specific pulse width of the pulsed electric power to the time length at least equal to or greater than twice times the period of the electric power supplied after the pairing process to charge the device to be charged, supplying the pulsed electric power with the specific pulse width to perform a pairing process to identify the combination between the power transmitter and the device to be charged by the power supply processor, the power to the device to be charged from the corresponding power transmitter is supplied to charge the device to be charged, wherein the device to be charged is provided on a vehicle, and the vehicle includes a power receiver, and the pulsed electric power is configured by a plurality of individual AC pulses transmitted from the power transmitter.

14. A pairing method used in a non-contact charging system, wherein the non-contact charging system includes a power receiver configured to receive electric power transmitted from a power transmitter in a noncontact manner, and the power transmitter is configured to transmit electric power in accordance with a specific pulse width set by a power supply processor, the power receiver is configured to supply the received electric power to a device to be charged, the pairing method comprising:

obtaining, by the device to be charged, information about the specific pulse width from pulsed electric power received from the power receiver;

transmitting the obtained information about the specific pulse width to the power supply processor, wherein the pulsed electric power with the specific pulse width is supplied to perform a pairing process to identify the combination between the power transmitter and the device to be charged by the power supply processor, the power to the device to be charged from the corresponding power transmitter is supplied to charge the device to be charged, and wherein a length of the specific pulse width is one second or more;

converting electric power input from a commercial power source to supply from the power transmitter by the power supply processor, supplying electric power that changes in pulses to the power transmitter by switching between supplying and stopping of an AC power by the power supply processor; and setting the specific pulse width of the pulsed electric power to the time length at least equal to or greater than twice times the period of the electric power supplied after the pairing process to charge the device to be charged, wherein the device to be charged is provided on a vehicle, and the vehicle includes a power receiver, and the pulsed electric power is configured by a plurality of individual AC pulses transmitted from the power transmitter.

15. A non-contact charging system comprising a plurality of power transmitters, a communication device, and a power supply processor, wherein the power transmitters are configured to supply electric power to a device to be charged in a noncontact manner, the communication device is configured to be capable of obtaining information transmitted from the device to be charged, the power supply processor is configured to control electric power transmitted by the power transmitters for each power transmitter, the existence of the device to be charged is detected, the power supply processor is configured to set a specific width as a pulse width of pulsed electric power transmitted from each power transmitter in response to detection of the existence of the device to be charged, and the specific pulse width varies from one power transmitter to another, the communication device is configured to receive information about the specific pulse width transmitted from the device to be charged, and the device to be charged is configured to obtain the specific pulse width from the received electric power, each power transmitter and the device to be charged corresponding to the power transmitter configure a combination, the power supply processor is configured to identify the combination of each power transmitter and the device to be charged corresponding to the power transmitter based on correspondence between the information about the specific pulse width that has been set and the information about the specific pulse width that has been received, wherein the device to be charged is provided on a vehicle, and the vehicle includes a power receiver, the power supply processor is configured to set, to the specific pulse width, the pulse width of electric power to be transmitted from each power transmitter, the specific pulse width varies from one power transmitter to another, the power supply processor is further configured to set, to an alignment pattern, the pattern of the electric power to be transmitted from each power transmitter, and the alignment pattern is used to align the power receiver of the vehicle with respect to each power transmitter, the alignment pattern is a pattern different from a pulse having the specific pulse width, the specific pulse width is a pulse width configured by only one pulse, the power supply processor is configured to supply the pulsed electric power with the specific pulse width to perform a pairing process to identify the combination between the power transmitter and the device to be charged, the power supply processor is configured to supply the power to the device to be charged after the pairing process from the corresponding power transmitter to charge the device to be charged, a length of the specific pulse width is one second or more, the power supply processor is configured to convert electric power input from a commercial power source to supply from each power transmitter, and to supply electric power that changes in pulses to each power transmitter by switching between supplying and stopping of an AC power, the specific pulse width of the pulsed electric power is set to the time length at least equal to or greater than twice times the period of the electric power supplied after the pairing process to charge the device to be charged, and the pulsed electric power is configured by a plurality of individual AC pulses transmitted from the power transmitter.

16. The non-contact charging system according to claim 15, wherein the alignment pattern is electric power that maintains a constant strength.

* * * * *